(12) United States Patent
Tamura et al.

(10) Patent No.: US 10,545,716 B2
(45) Date of Patent: Jan. 28, 2020

(54) INFORMATION PROCESSING DEVICE, INFORMATION PROCESSING METHOD, AND PROGRAM

(71) Applicant: SONY CORPORATION, Tokyo (JP)

(72) Inventors: Shigefumi Tamura, Tokyo (JP); Ryosuke Nomura, Kanagawa (JP); Tetsuo Ikeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 95 days.

(21) Appl. No.: 15/742,589

(22) PCT Filed: Jun. 17, 2016

(86) PCT No.: PCT/JP2016/068089
§ 371 (c)(1),
(2) Date: Jan. 8, 2018

(87) PCT Pub. No.: WO2017/033544
PCT Pub. Date: Mar. 2, 2017

(65) Prior Publication Data
US 2018/0203661 A1    Jul. 19, 2018

(30) Foreign Application Priority Data
Aug. 24, 2015 (JP) .................. 2015-164354

(51) Int. Cl.
*G09G 5/00* (2006.01)
*G06F 3/14* (2006.01)
(Continued)

(52) U.S. Cl.
CPC ........ *G06F 3/1454* (2013.01); *G06F 3/04883* (2013.01); *G09G 5/14* (2013.01); *H04N 7/15* (2013.01); *G09G 2354/00* (2013.01)

(58) Field of Classification Search
CPC ........ G06F 3/0416; G06F 3/011; G06F 3/041; G06F 3/0482; G06F 3/1454;
(Continued)

(56) References Cited

U.S. PATENT DOCUMENTS

2008/0167913 A1* 7/2008 Wiswell .............. G06Q 20/102
                                                                705/14.54
2009/0119593 A1* 5/2009 Hallock ................ G06F 3/0425
                                                                715/719

FOREIGN PATENT DOCUMENTS

JP    09-258945 A    10/1997
JP    10-336422 A    12/1998
(Continued)

*Primary Examiner* — Jennifer T Nguyen
(74) *Attorney, Agent, or Firm* — Paratus Law Group, PLLC

(57) ABSTRACT

There is provided an information processing device to make it possible to share various kinds of information in a more appropriate form between remote sites, the information processing device including: an acquiring unit configured to acquire first control information for causing display information to be displayed, the display information indicating a real object placed in a first region in which a screen shared by a plurality of devices is displayed; and a generating unit configured to generate second control information for causing a display image in which the display information indicating the real object is superimposed on the screen to be displayed in a second region different from the first region, on a basis of the acquired first control information.

24 Claims, 22 Drawing Sheets

(51) Int. Cl.
*H04N 7/15* (2006.01)
*G06F 3/0488* (2013.01)
*G09G 5/14* (2006.01)

(58) Field of Classification Search
CPC ....... G06F 3/04883; G06F 3/147; G09G 5/14; H04L 65/1089; H04L 65/4015
USPC .......................... 345/158, 173; 715/719, 764
See application file for complete search history.

(56) References Cited

FOREIGN PATENT DOCUMENTS

| | | |
|---|---|---|
| JP | 2000-259338 A | 9/2000 |
| JP | 2012-119927 A | 6/2012 |
| JP | 2014-130422 A | 7/2014 |

* cited by examiner

FIG. 16
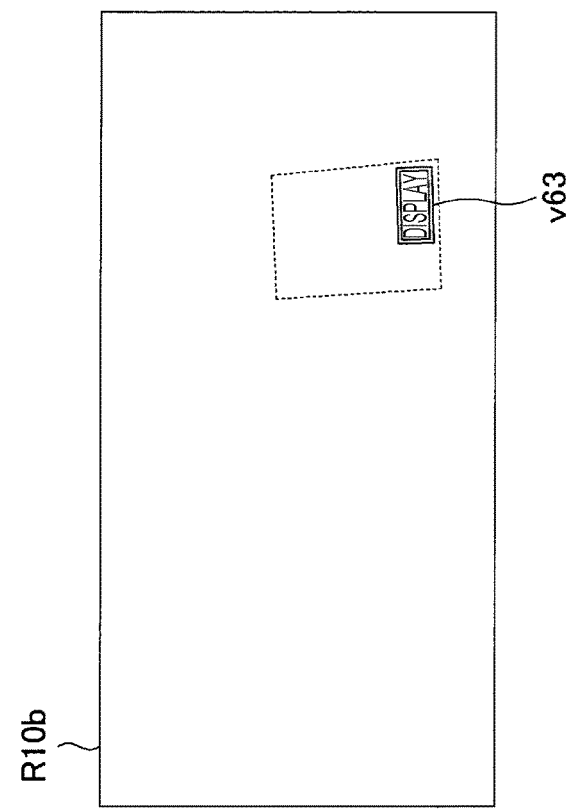
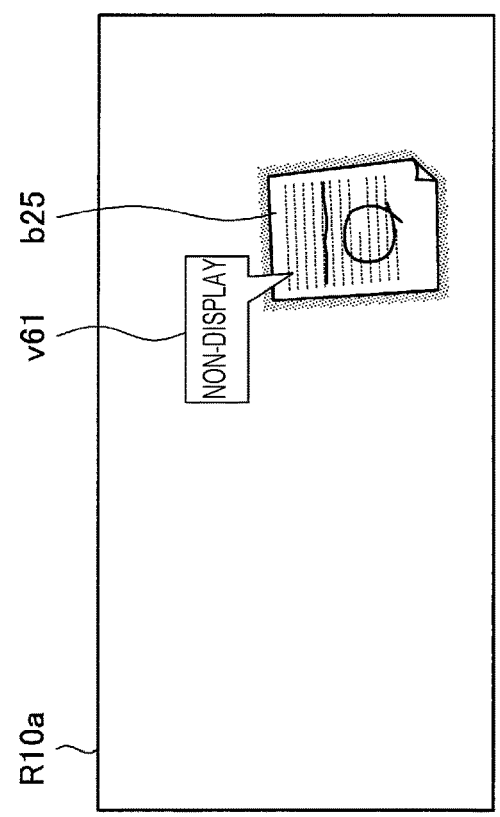

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/068089 (filed on Jun. 17, 2016) under 35 U.S.C. § 371, which claims priority to Japanese Patent Application No. 2015-164354 (filed on Aug. 24, 2015), which are all hereby incorporated by reference in their entirety.

TECHNICAL FIELD

The present disclosure relates to an information processing device, an information processing method, and a program.

BACKGROUND ART

In recent years, systems for implementing a conference between remote sites such as video conference systems or the like have become widespread. Among such systems, a system in which a display screen common to a plurality of terminals (for example, personal computers (PCs)) connected via a network is displayed, and each terminal is able to perform a manipulation on a display object displayed on the display screen, so that the display screen can be shared among the terminals is known. For example, an example of a system in which a display screen can be shared among a plurality of terminals connected via a network is disclosed in Patent Literature 1.

CITATION LIST

Patent Literature

Patent Literature 1: JP 2014-130422A

DISCLOSURE OF INVENTION

Technical Problem

On the other hand, information which is required to be shared among a plurality of users in a setting such as a conference is not necessarily limited to only display information displayed on a screen of a terminal such as a PC, and, for example, information presented on an object (real object) placed in a real space such as a document on a paper medium may be included as well. Therefore, there is a demand for a mechanism capable of sharing various kinds of information of display information displayed in a screen of a terminal or the like and other information (for example, information of a real object) different from the display information in a more appropriate form between remote sites.

In this regard, the present disclosure proposes an information processing device, an information processing method, and a computer which are capable of sharing various kinds of information in a more appropriate form between remote sites.

Solution to Problem

According to the present disclosure, there is provided an information processing device including: an acquiring unit configured to acquire first control information for causing display information to be displayed, the display information indicating a real object placed in a first region in which a screen shared by a plurality of devices is displayed; and a generating unit configured to generate second control information for causing a display image in which the display information indicating the real object is superimposed on the screen to be displayed in a second region different from the first region, on a basis of the acquired first control information.

In addition, according to the present disclosure, there is provided an information processing device including: an acquiring unit configured to acquire an image of a first region in which a screen shared by a plurality of devices is displayed, the image of the first region being captured by an imaging unit; and a generating unit configured to generate control information for causing display information indicating a real object placed in the first region to be displayed in a second region different from the first region in which the screen is displayed, on a basis of the acquired image of the first region.

In addition, according to the present disclosure, there is provided an information processing method including: acquiring first control information for causing display information indicating a real object placed in a first region in which a screen shared by a plurality of devices is displayed to be displayed in a second region different from the first region; and generating, by a processor, second control information for causing a display image in which the display information indicating the real object is superimposed on the screen to be displayed in the second region on a basis of the acquired first control information.

In addition, according to the present disclosure, there is provided an information processing method including: acquiring an image of a first region in which a screen shared by a plurality of devices is displayed, the image of the first region being captured by an imaging unit; and generating, by a processor, control information for causing display information indicating a real object placed in the first region to be displayed in a second region different from the first region in which the screen is displayed, on a basis of the acquired image of the first region.

In addition, according to the present disclosure, there is provided a program causing a computer to execute: acquiring first control information for causing display information indicating a real object placed in a first region in which a screen shared by a plurality of devices is displayed to be displayed in a second region different from the first region; and generating second control information for causing a display image in which the display information indicating the real object is superimposed on the screen to be displayed in the second region on a basis of the acquired first control information.

In addition, according to the present disclosure, there is provided a program causing a computer to execute: acquiring an image of a first region in which a screen shared by a plurality of devices is displayed, the image of the first region being captured by an imaging unit; and generating control information for causing display information indicating a real object placed in the first region to be displayed in a second region different from the first region in which the screen is displayed, on a basis of the acquired image of the first region.

Advantageous Effects of Invention

As described above, according to the present disclosure, an information processing device, an information processing method, and a computer which are capable of sharing a workspace in a more appropriate form between remote sites are provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 16 is an explanatory diagram for describing another form of the information processing system according to the third modified example.

MODE(S) FOR CARRYING OUT THE INVENTION

Figure 1:
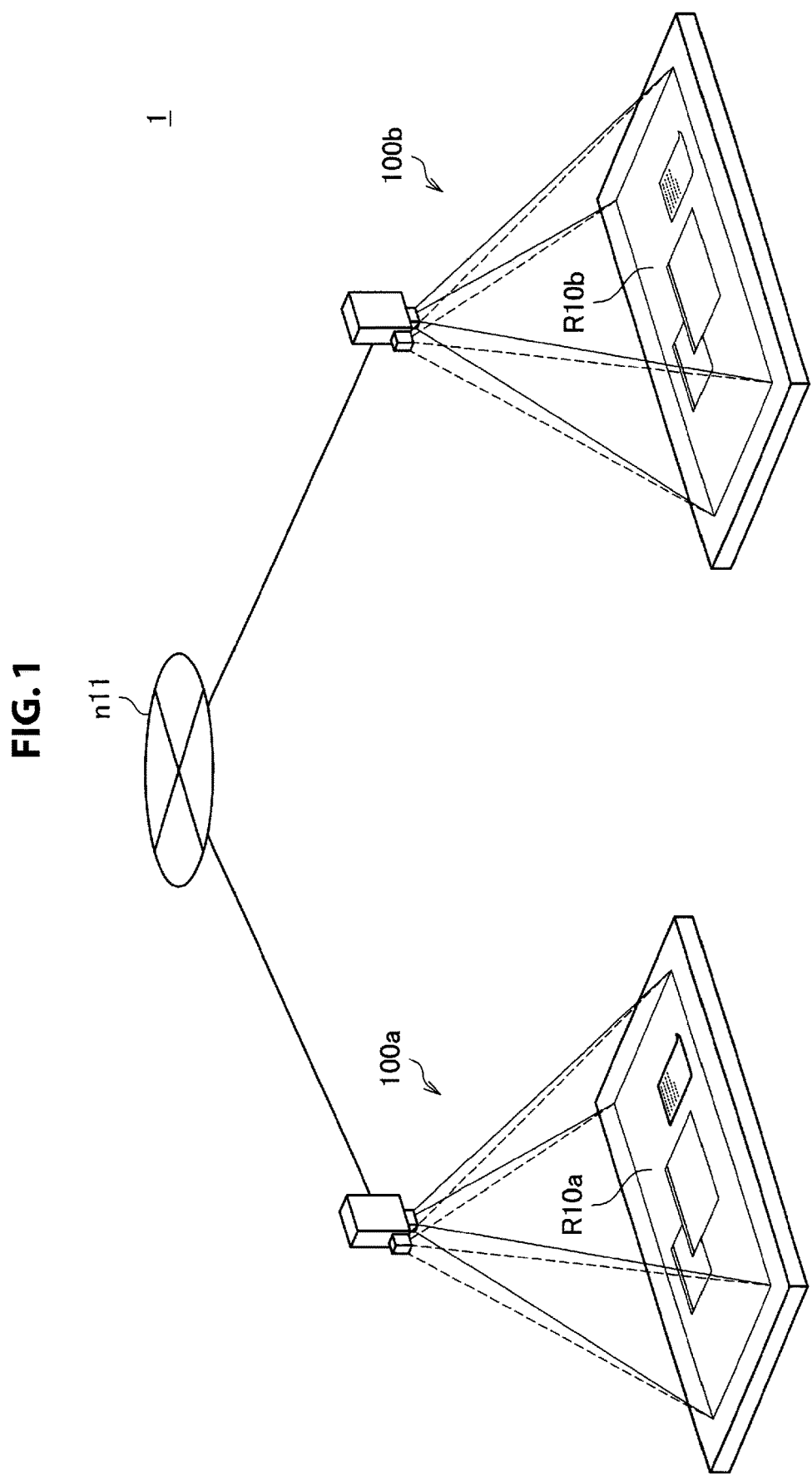
FIG. 1 is an explanatory diagram for describing an overview of an information processing system according to one embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, the description will proceed in the following order.

1. Overview
2. System configuration
3. Functional configuration
4. Process
5. Modified examples
5.1. First modified example: presentation of identification information
5.2. Second modified example: projection of information onto real object
5.3. Third modified example: display control of display information indicating real object
5.4. Fourth modified example: first system configuration example (example of master/slave configuration)
5.5. Fifth modified example: second system configuration example (configuration in in which server is disposed)
6. Hardware configuration
7. Conclusion <1. Overview>

First, an overview of an information processing system according to one embodiment of the present disclosure will be described. For example, FIG. 1 is an explanatory diagram for describing the overview of the information processing system according to one embodiment of the present disclosure. As illustrated in FIG. 1, an information processing system 1 according to the present embodiment provides a mechanism that includes a plurality of information processing devices 100 (for example, information processing devices 100*a* and 100*b*) connected via a network n11 and enables various kinds of information to be shared among the plurality of information processing devices 100.

Specifically, in the information processing system 1 according to the present embodiment, a common display screen can be shared among the plurality of information processing devices 100, and information of a real object (an object such as a document on a paper medium) placed in one workspace (for example, a space in which a display screen is displayed) is presented to another workspace as display information.

For example, in FIG. 1, reference numeral R10*a* indicates a region in which the information processing device 100*a* displays the common display screen to the information processing device 100*b*. Further, reference numeral R10*b* indicates a region in which the information processing device 100*b* displays the common display screen to the information processing device 100*a*.

In the information processing system 1 according to the present embodiment, the region R10*a* and the space between the information processing device 100*a* and the region R10*a* correspond to the workspace corresponding to the information processing device 100*a*. Further, a region R10*b* and the space between the information processing device 100*b* and the region R10*b* correspond to the workspace corresponding to the information processing device 100*b*.

In the information processing system 1 according to the present embodiment, for example, in a case in which a real object such as a document on a paper medium is arranged in the region R10*a*, the information processing device 100*a* detects the real object arranged in the region R10*a*. The information processing device 100*b* receives a detection result for the real object in the region R10*a* obtained by the information processing device 100*a* and presents display information indicating the real object to the region R10*b*.

With this configuration, the information processing system 1 enables information visible on the workspace corresponding to each of a plurality of information processing devices 100, that is, the display information displayed as the screen and information of the real object to be shared between remote sites.

In this regard, before the information processing system 1 according to the present embodiment is described in detail, in order to facilitate understanding of features of the information processing system 1, a configuration example of the information processing device 100 will be first described.

[1.1. Configuration Example of Information Processing Device]

Figure 2:
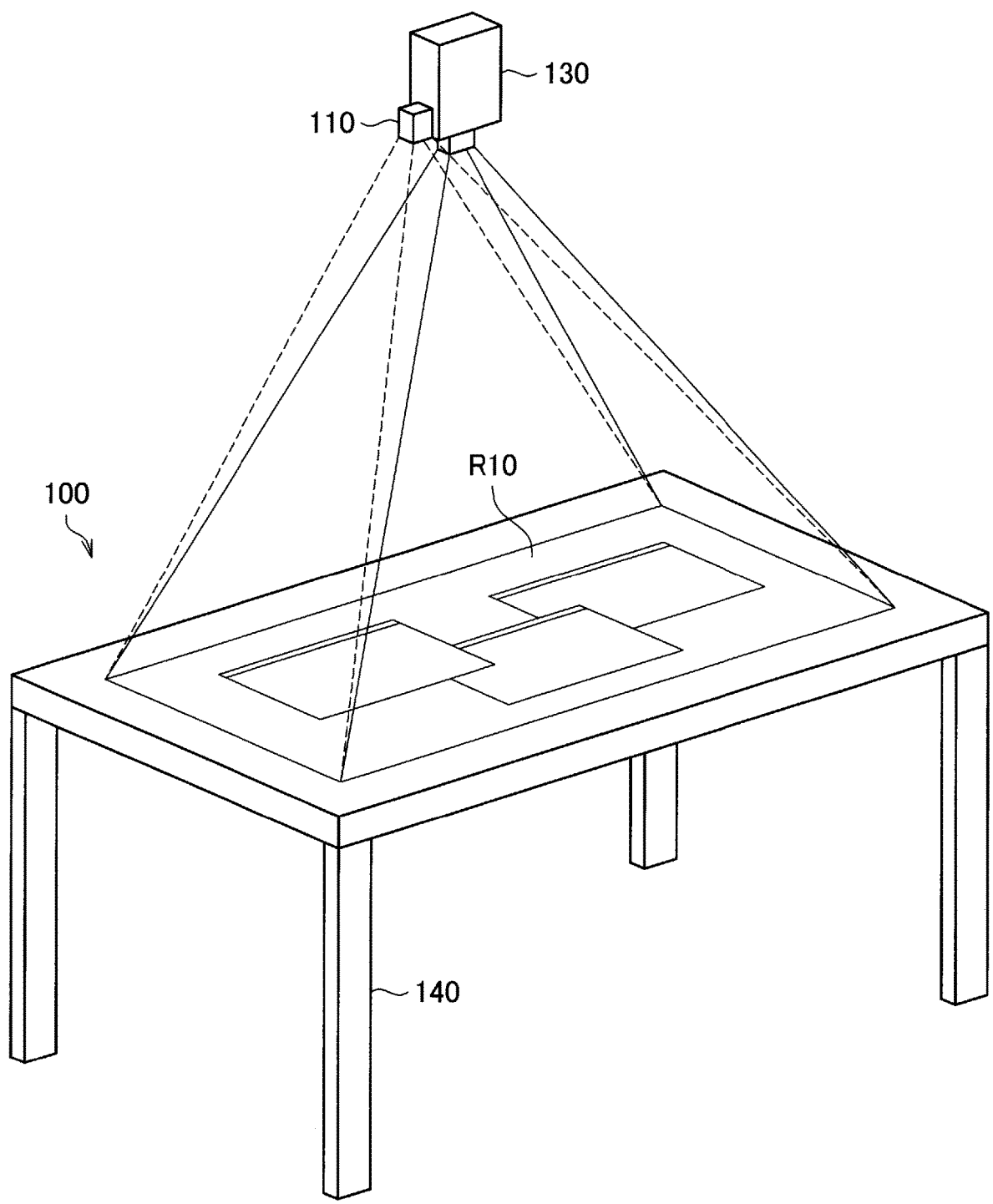
FIG. 2 is an explanatory diagram for describing a configuration example of an information processing device according to the embodiment.

A configuration example of the information processing device 100 according to one embodiment of the present disclosure will be described with reference to FIG. 2. FIG. 2 is an explanatory diagram for describing the configuration example of the information processing device according to one embodiment of the present disclosure.

As illustrated in FIG. 2, an information processing device 100 according to one embodiment of the present disclosure includes an input unit 110 and an output unit 130. The information processing device 100 according to one embodiment of the present disclosure illustrated in FIG. 1 causes information to be displayed on a top surface of a table 140 and enables a user using the information processing device 100 to perform a manipulation on the information displayed on the table 140. Note that, hereinafter, a scheme of displaying information on the top surface of the table 140 as illustrated in FIG. 2 is also referred to as a "projection type." Further, the information processing device 100 may be configured as an information processing system to which at least one of the input unit 110 and the output unit 130 is externally attached as an external device.

The input unit 110 is a device for inputting manipulation content of the user using the information processing device 100, a shape or a pattern of an object placed on the table 140, or the like. In the example illustrated in FIG. 2, the input unit 110 is provided above the table 140, for example, such that the input unit 110 is hung from a ceiling. In other words, the input unit 110 is disposed separately from the table 140 serving as the target on which information is displayed. As the input unit 110, for example, a camera for imaging the table 140 through one imaging optical system (for example, a series of lens groups), a stereo camera capable of imaging the table 140 through two imaging optical systems and recording information of a depth direction, or a sound collecting device (for example, a microphone or the like) for collecting acoustic information such as a voice spoken by the user using the information processing device 100 or an ambient sound of an environment in which the information processing device 100 is placed may be used.

In the case in which the camera for imaging the table 140 through one imaging optical system is used as the input unit 110, for example, the information processing device 100 analyzes an image captured by the camera and detects an object placed on the table 140. In a case in which the stereo camera is used as the input unit 110, for example, a visible light camera, an infrared camera, or the like can be applied as the stereo camera. When the stereo camera is used as the input unit 110, the input unit 110 can acquire depth information. When the depth information is acquired by the input unit 110, for example, the information processing device 100 can detect a real object such as a hand or an object placed on the table 140. Further, when the input unit 110 acquires the depth information, the information processing device 100 can detect a contact and an approach of a manipulator such as the hand of the user to the table 140 and separation of the manipulator from the table 140. Note that, in the following description, bringing the manipulator such as the hand into contact with or causing it to approach an information display surface by the user is also collectively referred to as "contact", simply.

In addition, in a case in which a microphone is used as the input unit 110, a microphone array for collecting acoustic information (for example, a sound) in a specific direction may be used as the microphone. In a case in which the microphone array is used as the input unit 110, the information processing device 100 may adjust a sound collection direction of the microphone array to an arbitrary direction. Further, the information processing device 100 may estimate an arrival direction of the acoustic information in accordance with a sound collection result of the acoustic information acquired by each of microphones included in the microphone array. As a specific example, the information processing device 100 may estimate the arrival direction of the acoustic information in accordance with a ratio of a volume of each piece of acoustic information collected by each of the microphones included in the array microphone.

Additionally, hereinafter, a case in which a manipulation by the user with a manipulator such as a hand is detected from an image captured by the input unit 110 will be mainly described. However, the present disclosure is not limited to the related example. A manipulation by the user may be detected by a touch panel that detects touch of a finger of the user. In addition, examples of the user manipulation that can be acquired by the input unit 110 may include a stylus manipulation toward an information display surface, a gesture manipulation toward a camera, or the like.

The output unit 130 is a component for displaying information on the table 140 or outputting a sound in accordance with manipulation content of the user using the information processing device 100, content of information output by the output unit 130, or information such as a shape, a pattern, or the like of an object placed on the table 140. For example, a projector, a speaker, or the like is used as the output unit 130.

In the example illustrated in FIG. 1, for example, the output unit 130 is provided above the table 140 to be suspended from the ceiling. In a case where the output unit 130 is configured as a projector, the output unit 130 projects information on the top surface of the table 140. Note that, hereinafter, a region (in other words, projection screen) into which information (in other words, display information) is projected by the output unit 130 may also be referred to as a "region R10".

In addition, in a case where the output unit 130 is configured as a speaker, the output unit 130 outputs a sound on the basis of a sound signal. In the case where the output unit 130 is configured as a speaker, the number of speakers may be one or plural. In a case where the output unit 130 is configured as a plurality of speakers, the information processing device 100 may limit the speakers outputting sounds or adjust a sound output direction.

In addition, in a case where the information processing device 100 is of a projection type, as illustrated in FIG. 2, the output unit 130 may include an illumination device. In a case where the output unit 130 includes an illumination device, the information processing device 100 may control an on or off state or the like of the illumination device on the basis of the content of information input by the input unit 110.

The user using the information processing device 100 can place his or her finger or the like on the table 140 to manipulate information displayed on the table 140 by the output unit 130. In addition, the user using the information processing device 100 can place an object on the table 140, cause the input unit 110 to recognize the object, and execute various manipulations on the recognized object (that is, a real object).

Note that, although not illustrated in FIG. 2, another device may be connected to the information processing device 100. For example, an illumination device for illuminating the table 140 may be connected to the information processing device 100. When the illumination device for illuminating the table 140 is connected to the information processing device 100, the information processing device 100 can control a lighting state of the illumination device in accordance with a state of an information display surface.

In addition, in the example illustrated in FIG. 2, the information processing device 100 is configured as a so-called table top type display device that projects information onto a projection plane extending in a horizontal direction such as the top surface of the table 140. On the other hand, a usage form of the information processing device 100 is not limited to only the table top type display device illustrated in FIG. 2.

Figure 3:
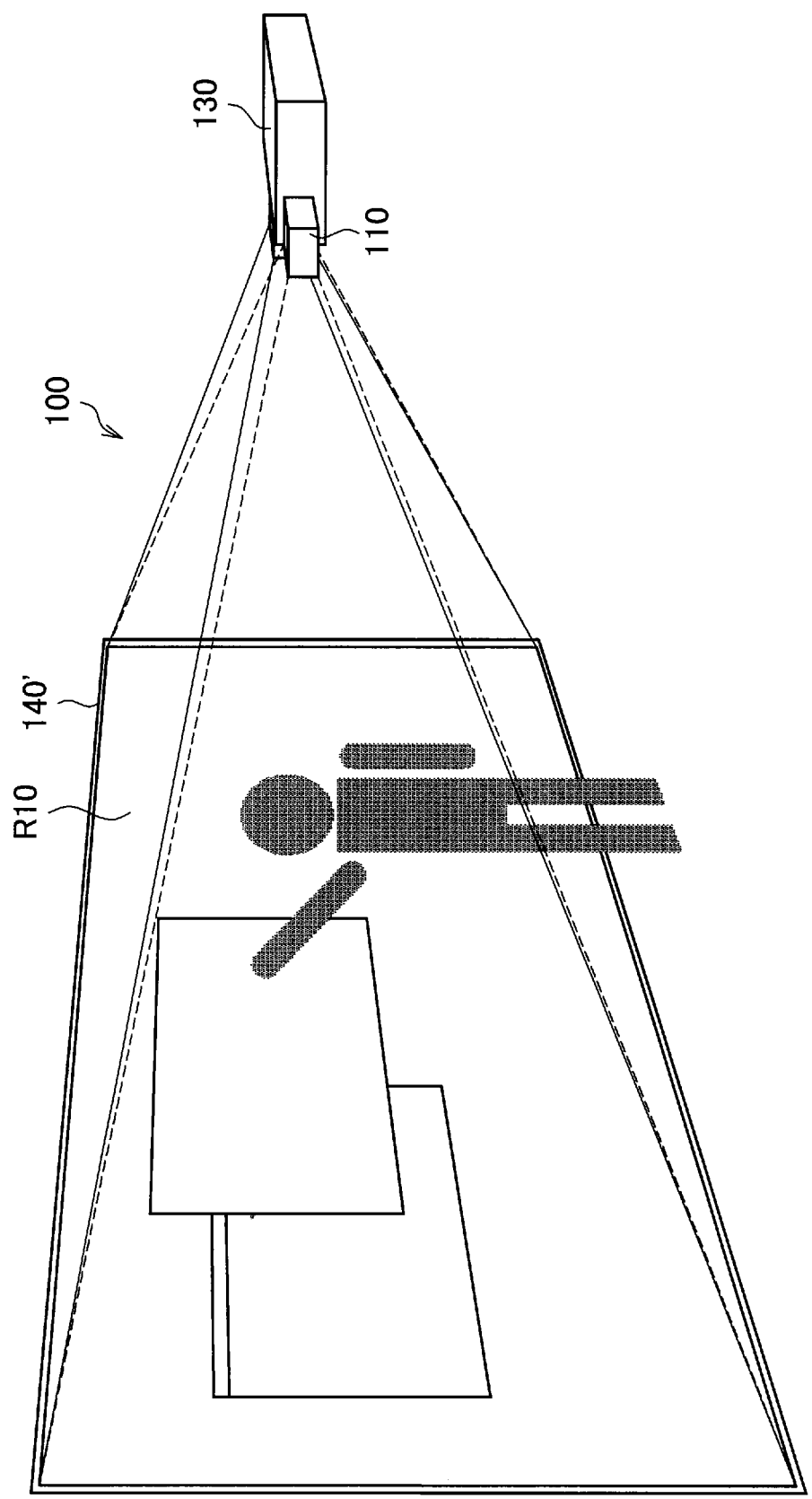
FIG. 3 is an explanatory diagram for describing another form of the information processing device according to the embodiment.

For example, FIG. 3 is an explanatory diagram for describing another form of the information processing device 100 according to the present embodiment and illustrates an example of a usage form of the information processing device 100. In the example illustrated in FIG. 3, the information processing device 100 projects information onto a projection plane extending in a vertical direction such as a wall surface 140'. In this case, of the wall surface 140', a region R10 onto which information is projected by the information processing device 100 and a front surface of the region R10 (that is, a space between the region R10 and the information processing device 100) corresponds to a workspace corresponding to the information processing device 100.

Further, the form of the information processing device 100 according to the present disclosure is not limited to the projection type illustrated in FIGS. 2 and 3 as long as information can be displayed in the region R10. Specifically, the information processing device 100 may form the region R10 with a transparent material such as a glass plate or a transparent plastic plate and may project information onto the region R10 from a back side of the region R10 so that information is displayed in the region R10 (a so-called "rear projection type"). In addition, as another example, in the information processing device 100, the region R10 may be configured as a flat panel display.

The configuration example of the information processing device 100 according to one embodiment of the present disclosure has been described with reference to FIGS. 2 and 3.

[1.2. Overview of Control]

Next, an overview of control in which the information processing system 1 according to one embodiment of the present disclosure enables the display information displayed as the screen and information of the real object to be shared among a plurality of information processing devices 100 will be described with reference to FIGS. 4 to 7. FIGS. 4 to 7 are explanatory diagrams for describing an overview of control for information sharing performed by the information processing system 1 according to one embodiment of the present disclosure. Further, the present description will proceed with an example in which the information processing system 1 includes the information processing devices 100a and 100b and enables various kinds of information to be shared between the information processing devices 100a and 100b as illustrated in FIG. 1.

Figure 4:
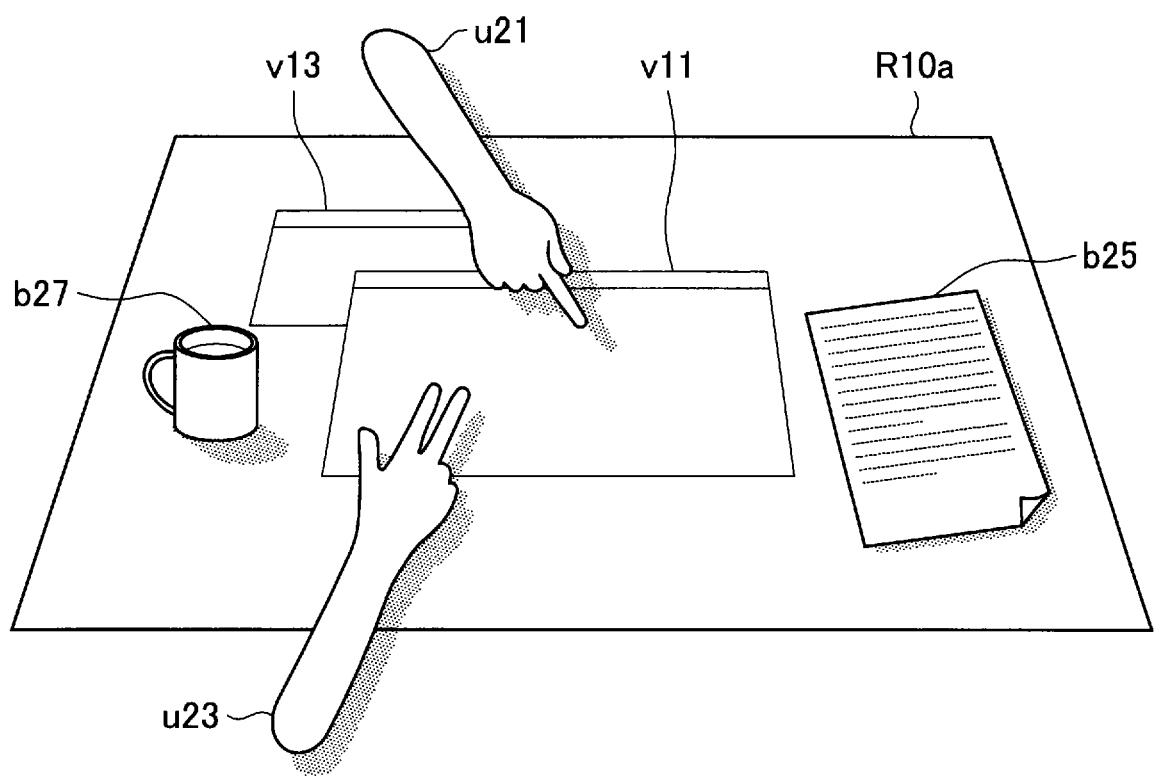
FIG. 4 is an explanatory diagram for describing an overview of control for information sharing by the information processing system according to the embodiment.

For example, FIG. 4 illustrates an example of a state of the workspace corresponding to any one of the plurality of information processing devices 100. Further, in the present description, FIG. 4 is assumed to illustrate the state of the workspace corresponding to the information processing device 100a.

Figure 5:
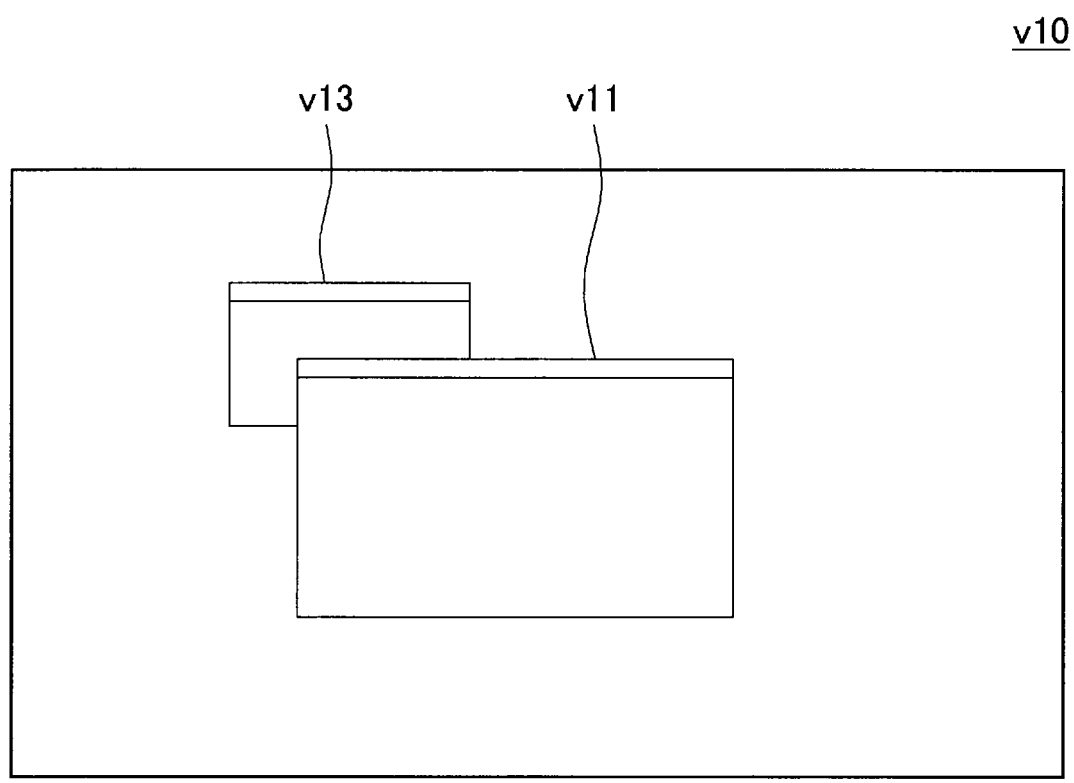
FIG. 5 is an explanatory diagram for describing an overview of control for information sharing by the information processing system according to the embodiment.

In the example illustrated in FIG. 4, a display screen on which display objects v11 and v13 are presented is displayed in the region R10a. For example, FIG. 5 illustrates an example of an image v10 indicating the display screen displayed (that is, projected) in the region R10a in the example illustrated in FIG. 4. Further, the image v10 illustrated in FIG. 5 indicates the display screen shared between the information processing devices 100a and 100b.

Further, a real object (a document on a paper medium) indicated by reference numeral b25 and a real object (a coffee cup) indicated by reference numeral b27 are arranged in the region R10a. Under such circumstances, in the example illustrated in FIG. 4, a plurality of users manipulate the display screen displayed in the region R10a by a so-called touch manipulation using each hand as a manipulator. Reference numerals u21 and u23 indicate manipulators corresponding to the users (that is, the hands of the users).

Figure 6:
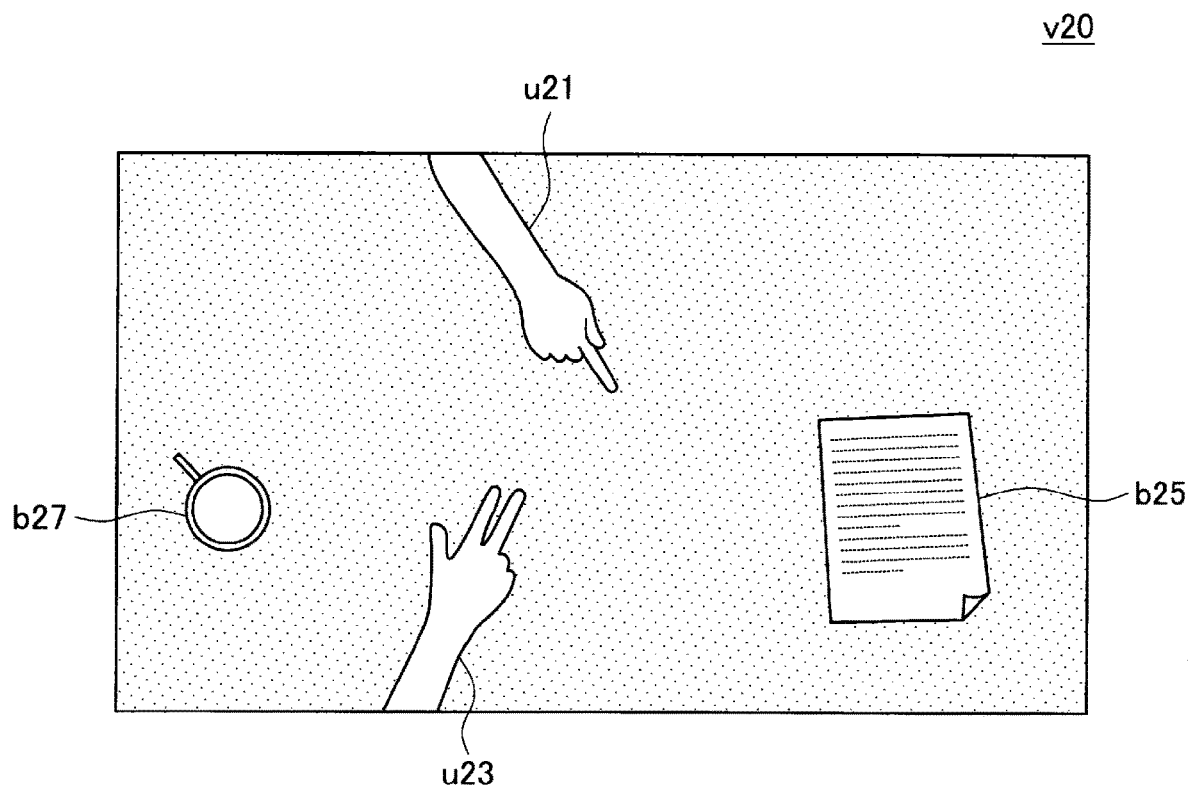
FIG. 6 is an explanatory diagram for describing an overview of control for information sharing by the information processing system according to the embodiment.

The information processing device 100a captures an image of the region R10a corresponding to the workspace corresponding to the information processing device 100a through the input unit 110 (for example, an imaging unit such as a camera), analyzes the captured image, and detects an object (a real object) placed in the region R10. For example, FIG. 6 illustrates an example of information v20 indicating a real object detected on the basis of the image of the region R10a illustrated in FIG. 4. In this case, as illustrated in FIG. 6, the information processing device 100a detects real objects b25 and b27 placed in the region R10a and the manipulators u21 and u23. Further, in the example illustrated in FIG. 6, the information processing device 100a extracts partial images of the real objects b25 and b27 placed in the region R10a and the manipulators u21 and u23 as the information v20 indicating the real object.

Then, the information processing device 100a transmits control information for displaying the image v10 indicating the display screen illustrated in FIG. 5 and control information for displaying the display information indicating the detected real object to the information processing device 100b via the network n11. Further, the information v20 indicating the real object illustrated in FIG. 6 (for example, the partial image of the real object placed in the region R10a) may correspond to the control information for displaying the display information indicating the detected real object. Further, hereinafter, the control information for displaying the image v10 indicating the display screen is also referred to as "screen data." Further, the control information for displaying the display information indicating the detected real object is also referred to "interim data." Further, the interim data corresponds to an example of "first control information."

The information processing device 100b causes the image v10 indicating the display screen illustrated in FIG. 5 to be displayed, for example, in the region R10b corresponding to the information processing device 100b on the basis of the screen data acquired from the information processing device 100a. Further, the information processing device 100b causes the display information indicating the real object in the region R10a detected by the information processing device 100a to be displayed superimposed on the display screen displayed in the region R10b on the basis of the interim data acquired from the information processing device 100a.

Figure 7:
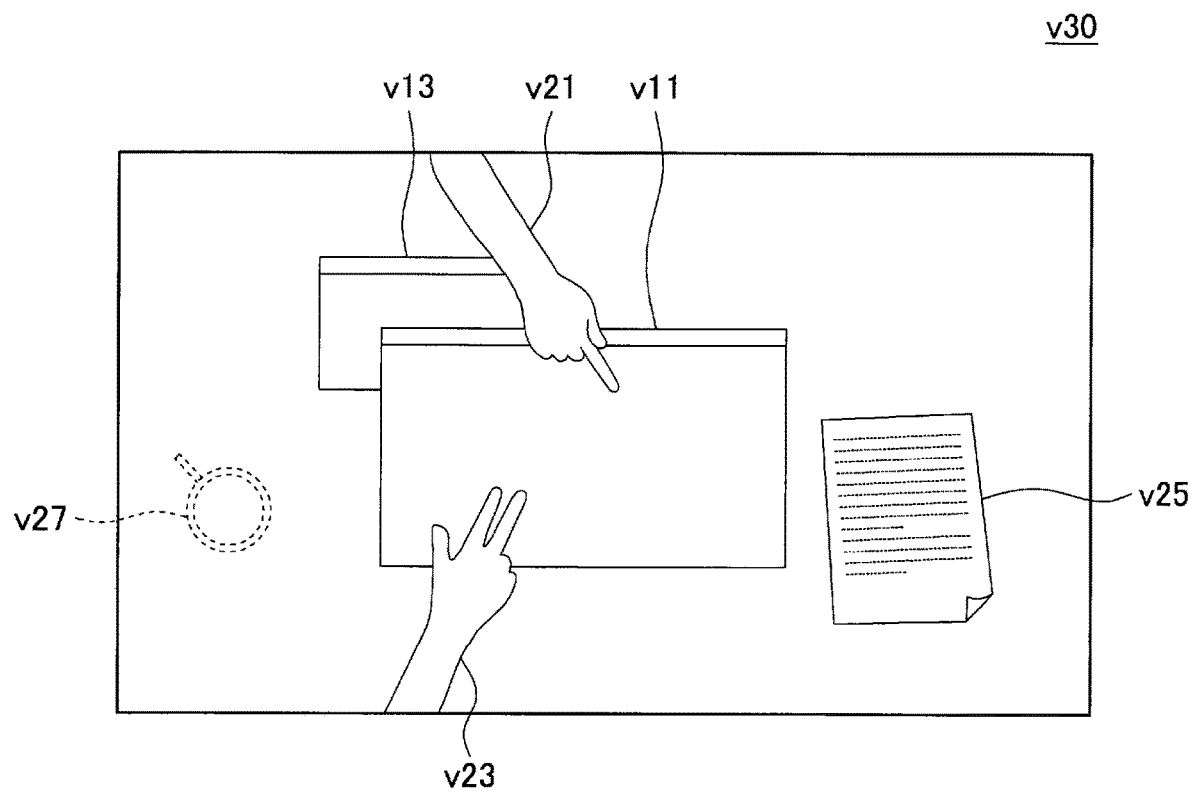
FIG. 7 is an explanatory diagram for describing an overview of control for information sharing by the information processing system according to the embodiment.

For example, FIG. 7 illustrates an example of an image v30 displayed in the region R10b by the information processing device 100b, that is, an example of an image in which the display information indicating the real object in the region R10a detected by the information processing device 100a is displayed superimposed on the display screen. In FIG. 7, reference numerals v21 and v21 indicate examples of display information (for example, images) indicating the manipulators u21 and u23 positioned in the region R10a in the example illustrated in FIG. 4. Further, reference numerals v25 and v27 indicate examples of display information indicating the real object b25 and b27 placed in the region R10a in the example illustrated in FIG. 4.

Note that, the information processing device 100b may restrict the display of the display information for some real object among the real objects indicated by the acquired interim data (that is, the real objects placed in the region R10a). For example, in the example illustrated in FIG. 7, the information processing device 100b restricts the display of the display information v27 indicating the real object b27 among the real objects placed in the region R10a illustrated in FIG. 4. As a specific example, the information processing device 100b may set only the real object satisfying a predetermined condition among the real objects indicated by the acquired interim data as the display target and restrict the display of the display information for the other real objects. Further, as another example, the information processing device 100b may restrict the display of the display information for real objects designated on the basis of the user manipulation. Further, an operation related to the display restriction of the display information corresponding to the real object will be separately described later in detail as a modified example.

Further, the display form of the display information is not particularly limited as long as the information processing device 100b can cause the display information v21 to v27 indicating the real object placed in the region R10a to be displayed in the region R10b. As a specific example, the information processing device 100b may cause the display information v21 to v27 to be displayed in the region R10b as the image of the corresponding real object in the region R10a as illustrated in FIG. 7. In addition, as another example, the information processing device 100b may cause the display information v21 to v27 to be displayed as display information (for example, a shadow) indicating the region of the corresponding real object in the region R10a.

Further, content of the interim data transmitted from the information processing device 100a is not particularly limited as long as the information processing device 100b can display the display information indicating the real object in the region R10b in a desired display form. For example, in a case in which the information processing device 100b displays the display information (for example, a shadow) indicating the region of the real object as the display information indicating the real object, the information processing device 100a may transmit vector information indicating the region of the real object as the interim data.

Further, the information processing device 100b may detect the real object placed in the region R10b corresponding to the information processing device 100b and transmit the interim data for displaying the display information indicating the real object to the information processing device 100a. In this case, the information processing device 100a may cause the display information indicating the real object in the region R10b detected by the information processing device 100b to be displayed superimposed on the display screen displayed in the region R10a on the basis of the interim data acquired from the information processing device 100b.

Further, the information processing device 100b receives a manipulation on various kinds of display information (for example, the display object v11 and v13 or the display information v21 to v27 illustrated in FIG. 7) displayed in the region R10b and transmits manipulation information indicating content of the manipulation to the information processing device 100a. In this case, the information processing device 100a may update the display screen (for example, the image v10 indicating the display screen illustrated in FIG. 5) shared between the information processing devices 100a and 100b on the basis of the manipulation information acquired from the information processing device 100b.

With the above configuration, according to the information processing system 1 of the present embodiment, it is possible to share the display screen and the information indicating the real object placed in one workspace between a plurality of information processing devices 100 (for example, between remote sites connected via the network n11) in an appropriate form.

The overview of the control of enabling the display information displayed as the screen and the information of the real object to be shared among the plurality of information processing devices 100 through the information processing system 1 according to one embodiment of the present disclosure has been described above with reference to FIGS. 4 to 7. Further, the information processing system 1 according to one embodiment of the present disclosure will be described below in further detail.

<2. System Configuration>

Figure 8:
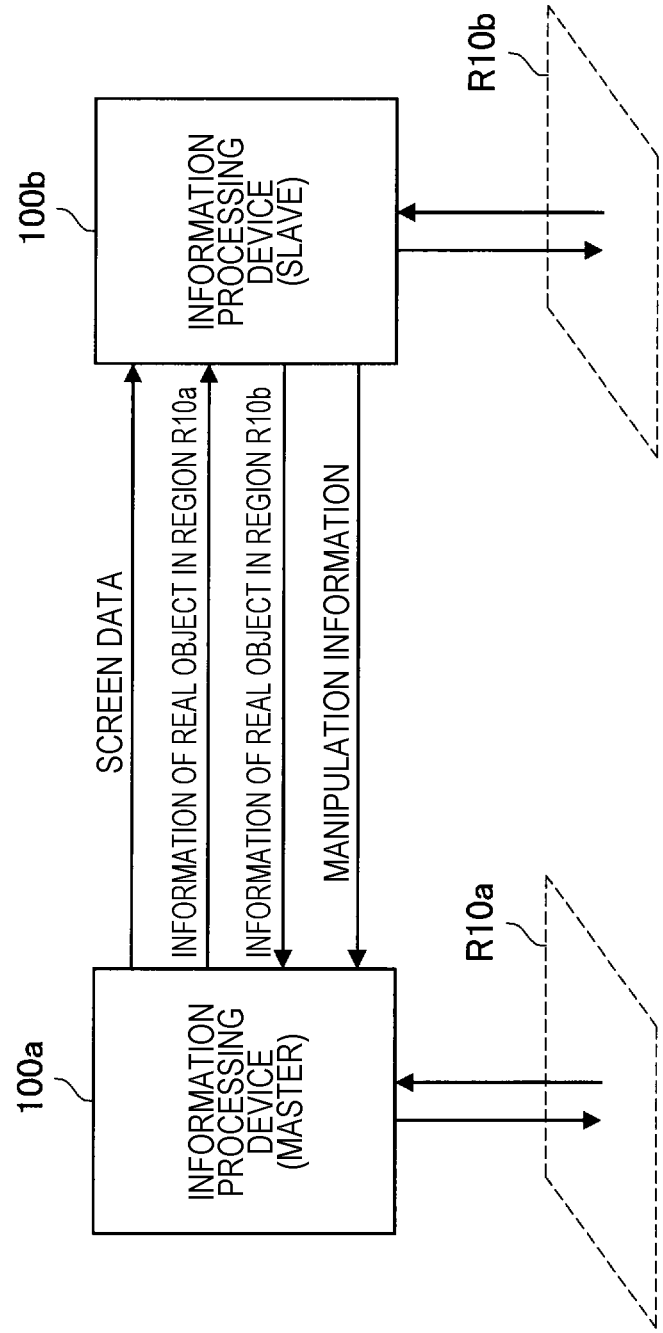
FIG. 8 is an explanatory diagram for describing an example of a schematic system configuration of the information processing system according to the embodiment.

First, an example of a schematic system configuration of the information processing system 1 according to one embodiment of the present disclosure will be described with reference to FIG. 8. FIG. 8 is an explanatory diagram for describing an example of a schematic system configuration of the information processing system 1 according to one embodiment of the present disclosure.

In the example illustrated in FIG. 8, in the information processing system 1, one of a plurality of information processing devices 100 operates as a master, and an information processing device 100 other than the information processing device 100 operating as the master operates as a slave. As a specific example, in the example illustrated in FIG. 8, the information processing device 100a out of the information processing devices 100a and 100b operates as the master, and the information processing device 100b operates as the slave.

In the case of the system configuration illustrated in FIG. 8, the information processing device 100a operating as the master generates and updates the display screen shared between the information processing devices 100a and 100b.

Specifically, the information processing device 100a generates the display screen to be shared between the information processing devices 100a and 100b, causes the generated display screen to be displayed in the region R10a, and transmits screen data for displaying the display screen to the information processing device 100b operating as the slave. The information processing device 100b causes the display screen to be displayed in the region R10b on the basis of the screen data acquired from the information processing device 100a. As a result, the display screen common to the information processing devices 100a and 100b is displayed in the region R10a and the region R10b.

Further, in the example illustrated in FIG. 8, the information processing device 100a analyzes the image of the region R10a captured by its own input unit 110 and detects the real object (for example, the manipulator or other objects) positioned in the region 10a on the basis of an analysis result. The information processing device 100a generates the interim data (that is, the information of the real object) for displaying the display information indicating the detected real object and transmits the generated interim data to the other information processing device 100b. The information processing device 100b causes the display information indicating the real object placed in the region R10a to be displayed superimposed on the display screen displayed in the region R10b on the basis of the interim data acquired from the information processing device 100a.

In a similar way, the information processing device 100b analyzes the image of the region R10b captured by its own input unit 110 and detects the real object positioned in the region 10b on the basis of an analysis result. The information processing device 100b generates the interim data for displaying the display information indicating the detected real object and transmits the generated interim data to the other information processing device 100a. The information processing device 100a causes the display information indicating the real object placed in the region R10b to be displayed superimposed on the display screen displayed in the region R10a on the basis of the interim data acquired from the information processing device 100b.

Further, the information processing device 100a operating as the master receives a user manipulation on the display screen displayed in each of the regions R10a and R10b and updates the display screen on the basis of content of the manipulation.

Specifically, the information processing device 100a operating as the master analyzes the image of the region R10a captured by its own input unit 110 and recognizes the content of the user manipulation on the display screen displayed in the region R10a on the basis of an analysis result.

Similarly, the information processing device 100b operating as the slave analyzes the image of the region R10b captured by its own input unit 110 and recognizes content of the user manipulation on the display screen displayed in the region R10b on the basis of an analysis result. Then, the information processing device 100b transmits manipulation information indicating the recognized manipulation content to the information processing device 100a operating as the master. Accordingly, the information processing device 100a can recognize the content of the user manipulation on the display screen displayed in the region R10b.

As described above, the information processing device 100a operating as the master recognizes the manipulation content of the user manipulation on the display screen displayed in each of the regions R10a and R10b and updates the display screen shared between the information processing devices 100a and 100b on the basis of the recognized manipulation content. Then, the information processing device 100a updates the display screen displayed in the region R10a with the updated display screen and transmits the screen data for displaying the display screen to the information processing device 100b operating as the slave. The information processing device 100b updates the display screen displayed in the region R10b on the basis of the screen data acquired from the information processing device 100a.

With the above configuration, according to the information processing system 1 of the present embodiment, it is possible to share the display screen to be shared and the information indicating the real object placed in each workspace between the information processing devices 100a and 100b in an appropriate form. The example of the schematic system configuration of the information processing system 1 according to one embodiment of the present disclosure has been described above with reference to FIG. 8.

<3. Functional Configuration>

Figure 9:
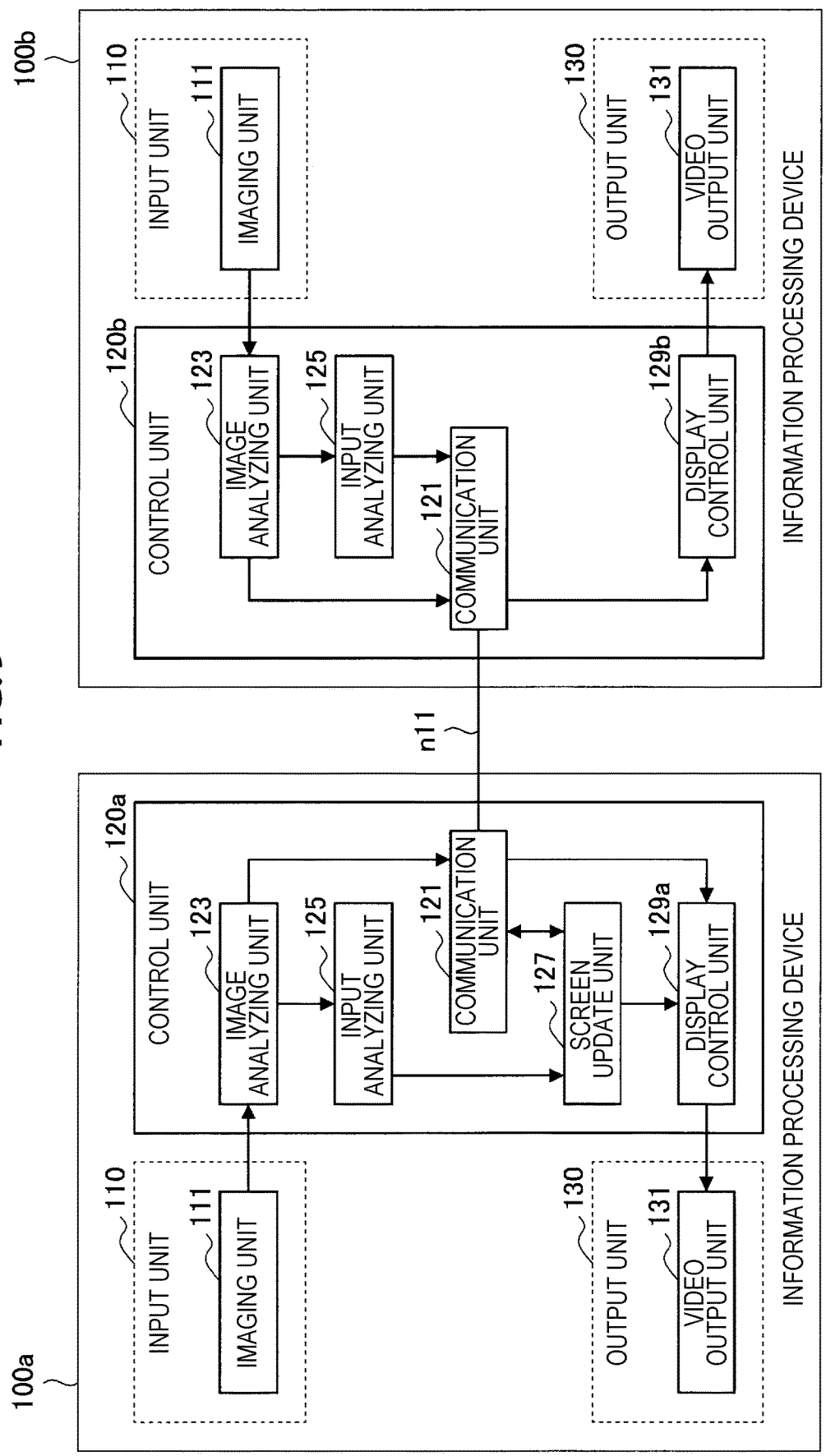
FIG. 9 is a block diagram illustrating an example of a functional configuration of the information processing system according to the embodiment.

Next, an example of a functional configuration of the information processing system 1 according to one embodiment of the present disclosure will be described with reference to FIG. 9. FIG. 9 is a block diagram illustrating an example of a functional configuration of information processing system 1 according to one embodiment of the present disclosure. Further, in the present description, as illustrated in FIG. 8, the information processing system 1 is configured such that the information processing device 100a out of the information processing devices 100a and 100b operates as the master, and the information processing device 100b operates as the slave. Further, in the present description, the information processing devices 100a and 100b are also referred to simply as an "information processing device 100" in a case in which they are not particularly distinguished.

As illustrated in FIG. 9, the information processing device 100a includes an input unit 110, a control unit 120a, and an output unit 130. Further, the information processing device 100b includes an input unit 110, a control unit 120b, and an output unit 130. Further, the input units 110 and the output units 130 of the information processing devices 100a and 100b have similar configurations. Further, as illustrated in FIG. 9, the control unit 120a of the information processing device 100a and the control unit 120b of the information processing device 100b are strictly different in functional configuration, but in a case in which the control units 120a and 120b are not particularly distinguished, they are also referred to as a "control unit 120."

The input unit 110 is a component for acquiring content of manipulations performed by the user using the information processing device 100 on the information processing device 100 or information indicating a shape, a pattern, or the like of an object placed on a surface to which the output unit 130 outputs information (for example, the region R10 such as the top surface of the table 140a illustrated in FIG. 2). The content of manipulations performed by the user using the information processing device 100 on the information processing device 100 includes content of manipulations performed on a display screen (for example, GUI) which the information processing device 100 outputs to the information display surface.

For example, in a case in which the information processing device 100 is a projection type, the imaging unit 111 included in the input unit 110 acquires the content of manipulations performed by the user on the information processing device 100 or the information indicating a shape, a pattern, or the like of an object placed on the region R10, as image information. Specifically, the imaging unit 111 captures, for example, an image of the region R10 and outputs the captured image to a control unit 120 to be described later. Note that, the imaging unit 111 may be, for example, a camera including one imaging optical system, a stereo camera including two imaging optical systems, or the like.

Further, the input unit 110 may include a sound collecting device such as a microphone and include a component for collecting acoustic information such as a voice spoken by the user and an ambient sound of a surrounding environment as input information.

The control unit 120*a* includes a communication unit 121, an image analyzing unit 123, an input analyzing unit 125, a screen update unit 127, and a display control unit 129*a*. Further, the control unit 120*b* includes a communication unit 121, an image analyzing unit 123, an input analyzing unit 125, and a display control unit 129*b*.

First, the communication unit 121, the image analyzing unit 123, and the input analyzing unit 125 of the control unit 120*a* will be described.

The communication unit 121 is a communication interface that enables the components of the control unit 120*a* to communicate with the external information processing device 100*b* via the network n11. The network n11 may include, for example, the Internet, a dedicated line, a local area network (LAN), a wide area network (WAN), or the like. Further, the network n11 may be configured as a wireless network or may be configured as a wired network. In other words, a form of network n11 is not particularly limited as long as different devices are connected via a network. Further, in the following description, in a case in which the components of the control unit 120*a* perform transmission and reception of information with the external information processing device 100*b* via the network n11, transmission and reception of the information are assumed to be performed through the communication unit 121 even in a case in which there is no particular explanation.

The image analyzing unit 123 acquires the image of the region R10*a* captured by the imaging unit 111, analyzes the image, and detects the manipulator such as the hand positioned in the region R10*a* or the real object such as an object placed in the region R10*a*. Further, at this time, the image analyzing unit 123 may detect only the real object satisfying a predetermined condition among the real objects placed in the region R10*a* as a target. As a specific example, the image analyzing unit 123 may detect only an operating real object (that is, a moving object) among the detected real objects. In addition, as another example, the image analyzing unit 123 may detect only a real object having a predetermined shape feature among the detected real objects.

The image analyzing unit 123 outputs the control information (that is, the interim data) indicating the detected real object in the region R10*a* to the input analyzing unit 125 and transmits the control information to the external information processing device 100*b* via the network n11. Further, the interim data may be image information of the real object in the region R10*a*. Further, as another example, the interim data may be control information for displaying (or forming) display information indicating a region corresponding to a real object in the region R10*a* such as vector information indicating a position, a direction, a range, or the like of the region corresponding to the real object in the region R10*a*.

The input analyzing unit 125 acquires the interim data indicating the detected real object in the region R10*a* from the image analyzing unit 123. The input analyzing unit 125 specifies a real object satisfying a predetermined condition among the detected real objects in the region R10*a* as the manipulator on the basis of the acquired interim data. As a specific example, the input analyzing unit 125 specifies a real object (for example, a hand) having a predetermined shape feature among the detected real objects as the manipulator. Further, for example, even in a case in which the hand is specified as the manipulator, only in a case in which the hand has a specific shape (for example, in a case in which it has a shape of designating an object with a finger) the input analyzing unit 125 may recognize the hand as the manipulator. Further, as another example, the input analyzing unit 125 may specify an operating real object (that is, a moving object) among the detected real objects as the manipulator.

The input analyzing unit 125 specifies a target of the user manipulation performed by the manipulator or content of the user manipulation on the basis of a position or a motion of the real object specified as the manipulator. Further, at this time, when coordinates of the region R10 for displaying information are calibrated to coincide with contact coordinates of the manipulator such as the hand of the user in the region R10 in advance, for example, the input analyzing unit 125 can detects a portion of the display screen (for example, a GUI) touched by the manipulator.

As described above, the input analyzing unit 125 specifies content of the user manipulation performed by the manipulator such as the hand in the region R10*a* (specifically, a manipulation target or a type of the manipulation), and output manipulation information indicating the specified content of the user manipulation to the screen update unit 127.

Next, the communication unit 121, the image analyzing unit 123, and the input analyzing unit 125 in the control unit 120*b* will be described.

The communication unit 121 and the image analyzing unit 123 in the control unit 120*b* are similar to the communication unit 121 and the image analyzing unit 123 in the control unit 120*a*.

In other words, the communication unit 121 of the control unit 120*b* is a communication interface that enables the components of the control unit 120*b* to communicate with the external information processing device 100*a* via the network n11. Further, in the following description, in a case in which the components of the control unit 120*b* perform transmission and reception of information with the external information processing device 100*a* via the network n11, transmission and reception of the information are assumed to be performed through the communication unit 121 even in a case in which there is no particular explanation.

In addition, the image analyzing unit 123 in the control unit 120*b* acquires the image of the region R10*b* captured by the imaging unit 111, analyzes the image, and detects the manipulator such as the hand positioned in the region R10*b* or the real object such as an object placed in the region R10*b*. Then, the image analyzing unit 123 outputs the interim data indicating the detected real object in the region R10*b* to the input analyzing unit 125 of the control unit 120*b* and transmits the interim data to the external information processing device 100a via the network n11.

Further, the input analyzing unit 125 of the control unit 120b is similar to the input analyzing unit 125 of the control unit 120a in an operation of specifying the manipulator on the basis of the interim data acquired from the image analyzing unit 123 and specifying the content of the user manipulation performed by the manipulator (that is, the manipulation target or the type of manipulation).

In other words, the input analyzing unit 125 acquires the interim data indicating the detected real object in the region R10b from the image analyzing unit 123. The input analyzing unit 125 specifies a real object satisfying a predetermined condition among the detected real objects in the region R10b as the manipulator on the basis of the acquired interim data.

Then, the input analyzing unit 125 of the control unit 120b specifies the content of the user manipulation performed by the manipulator in the region R10b (specifically, the manipulation target or the type of manipulation) on the basis of the position or the motion of the specified manipulator and transmits the manipulation information indicating the specified content of the user manipulation to the information processing device 100a via the network n11.

Next, the screen update unit 127 and the display control unit 129a of the control unit 120a, the display control unit 129b of the control unit 120b, and the output unit 130 of each information processing device 100 will be described.

The screen update unit 127 is a component for generating and updating the display screen shared between the information processing devices 100a and 100b.

Specifically, the screen update unit 127 generates the display screen to be shared between the information processing devices 100a and 100b on the basis of an operation statuses of various kinds of applications. The screen update unit 127 outputs the generated display screen to the display control unit 129a and transmits the screen data for displaying the display screen to the external information processing device 100b via the network n11. Further, the screen data may be, for example, the image information indicating the display screen. Further, as another example, the screen data may be control information for displaying (or forming) the display screen such as the vector information indicating the position, the direction, the range, or the like of the display object in the display screen.

Further, the screen update unit 127 receives the user manipulation on the display screen displayed on each of the regions R10a and R10b and updates the display screen on the basis of the content of the manipulation.

Specifically, the screen update unit 127 acquires the manipulation information indicating the content of the user manipulation on the display screen displayed in the region R10a from the input analyzing unit 125. In other words, the screen update unit 127 recognizes the content of the user manipulation on the display screen displayed in the region R10a (specifically, the manipulation target or the type of manipulation) on the basis of the manipulation information acquired from the input analyzing unit 125.

Further, the screen update unit 127 acquires the manipulation information indicating the content of the user manipulation on the display screen displayed in the region R10b which is similarly generated in the information processing device 100b from the information processing device 100b via the network n11.

As described above, the screen update unit 127 recognizes the manipulation content of the user manipulation on the display screen displayed on each of the region R10a and the region R10b, and updates the display screen to be shared between the information processing device 100a and 100b on the basis of the recognized manipulation content. Then, the screen update unit 127 outputs the updated display screen to the display control unit 129a, and transmits the screen data for displaying the display screen to the external information processing device 100b via the network n11.

The display control unit 129a acquires the generated or updated display screen from the screen update unit 127. Further, the display control unit 129a acquires the interim data indicating the detected real object in the region R10b from the information processing device 100b via the network n11. The display control unit 129a generates the display information indicating the real object in the region R10b on the basis of the acquired interim data. Then, the display control unit 129a generates an image in which the generated display information indicating the real object in the region R10b is superimposed on the acquired display screen and causes the output unit 130 to output the generated image. Accordingly, the display screen on which the display information indicating the real object in region R10b is superimposed is displayed in the region R10a.

Further, at this time, the display control unit 129a may generate the display information indicating the real object only for a real object satisfying a predetermined condition among the real objects indicated by the acquired interim data. As a specific example, the display control unit 129a may generate the display information only for an operating real object (that is, a moving object) among the real objects indicated by the interim data. Further, as another example, the display control unit 129a may generate the display information only for a real object having a predetermined shape feature among the real objects indicated by interim data.

Further, the display control unit 129b acquires the screen data for displaying the generated or updated display screen from the information processing device 100a via the network n11. Further, the display control unit 129b acquires the interim data indicating the detected real object in the region R10a from the information processing device 100a via the network n11. The display control unit 129b generates display information indicating the real object in the region R10a on the basis of the acquired interim data. Then, the display control unit 129b generates an image in which the generated display information indicating the real object in the region R10a is superimposed on the display screen based on the acquired screen data and causes the output unit 130 to output the generated image. Accordingly, the display screen on which the display information indicating the real object in the region R10a is superimposed is displayed in the region R10b.

Further, hereinafter, the display control units 129a and 129b are also referred to simply as a "display control unit 129" in a case in which they are not particularly distinguished. Further, in this configuration, the image generated by each of the display control units 129a and 129b (that is, the image in which the display information indicating the real object is superimposed on the display screen based on the screen data) corresponds to an example of "second control information."

The output unit 130 outputs the information generated by the control unit 120 in accordance with the manipulation content input by the input unit 110, content of information output by the output unit 130, or information of the real object in the region R10 to which the output unit 130 outputs information.

For example, the video output unit 131 included in the output unit 130 is a component for outputting display information such as a screen (GUI) on which the display object is presented. In a case in which the information processing device 100 is configured as the projection type, the video output unit 131 may be, for example, a projector for projecting the display information onto a desired projection plane (that is, region R10).

Further, the output unit 130 may include an acoustic device such as a speaker and include a component for outputting acoustic information such as a sound effect, music, a sound, or the like as the output information.

The example of the functional configuration of the information processing system 1 according to one embodiment of the present disclosure has been described above with reference to FIG. 9.

<4. Process>

Figure 10:
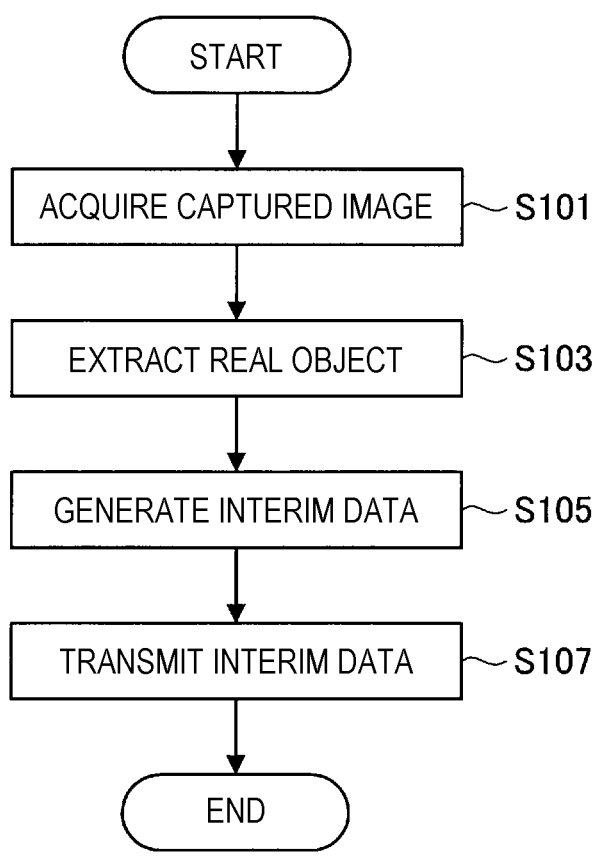
FIG. 10 is a flowchart illustrating an example of a flow of a series of processes of the information processing system according to the embodiment.
Figure 11:
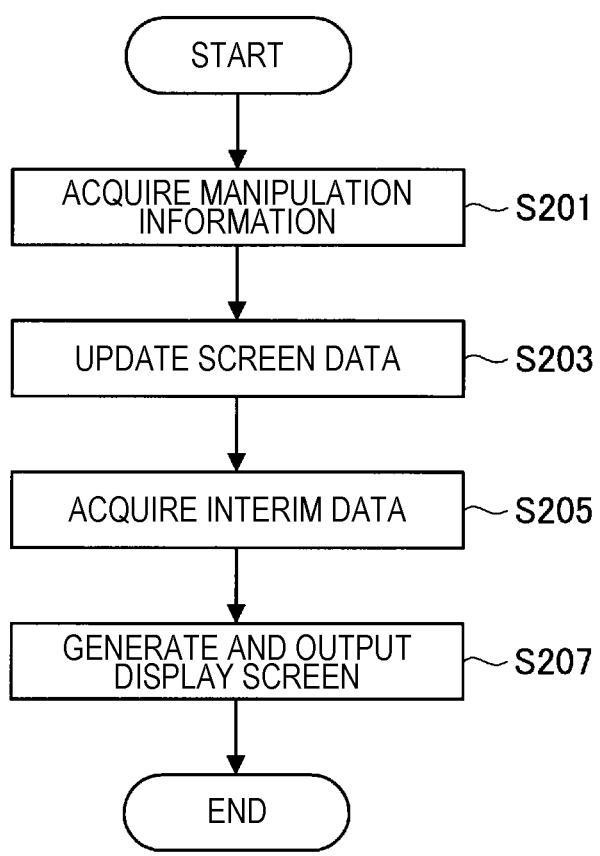
FIG. 11 is a flowchart illustrating an example of a flow of a series of processes of the information processing system according to the embodiment.
Figure 12:
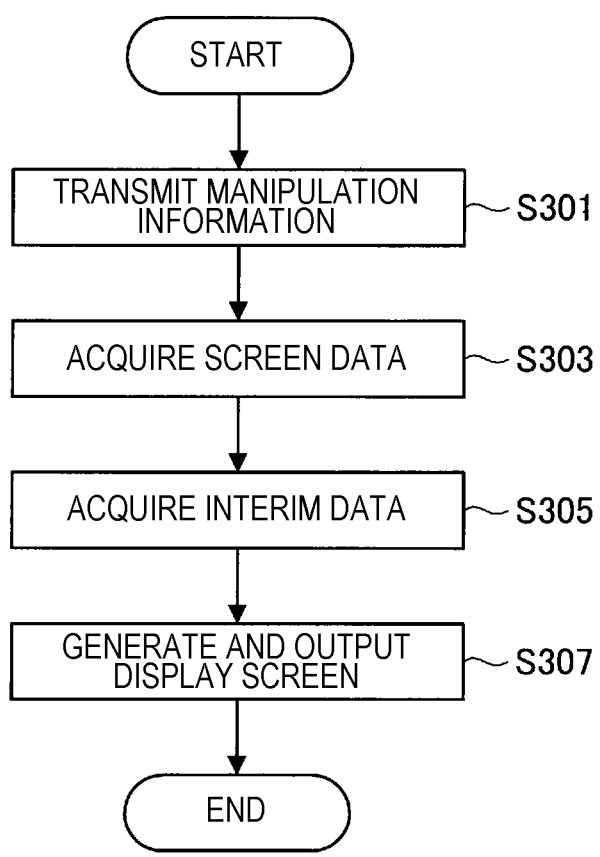
FIG. 12 is a flowchart illustrating an example of a flow of a series of processes of the information processing system according to the embodiment.

Next, an example of a flow of a series of processes of the information processing system 1 according to one embodiment of the present disclosure will be described with reference to FIG. 10 to FIG. 12. FIGS. 10 to 12 are flowcharts illustrating an example of a flow of a series of processes of the information processing system 1 according to one embodiment of the present disclosure. Note that, in the present description, a process is divided into processes of "generation and transmission of the interim data" performed by the information processing devices 100*a* and 100*b*, "update and output of the display screen" performed by the information processing device 100*a*, and "acquisition and output of the display screen" performed by the information processing device 100*b*, and each process will be described.

[4.1. Generation and Transmission of Interim Data]

First, an example of a flow of a process in which each of the information processing devices 100*a* and 100*b* generates the interim data and transmits the generated interim data to the external information processing device 100 will be described with reference to FIG. 10. Further, the following description will proceed focusing on an operation of the information processing device 100*a*, but the same applies to the information processing device 100*b*.

(Step S101)

The imaging unit 111 included in the input unit 110 of the information processing device 100*a* captures the image of the region R10*a* and outputs the captured image to the control unit 120*a*. Further, a timing at which the imaging unit 111 captures the image of the region R10*a* and a timing at which the captured image is output to the control unit 120*a* are not particularly limited. As a specific example, the imaging unit 111 may capture the image of the region R10*a* at intervals of predetermined timings and sequentially output the captured image to the control unit 120*a*. Further, as another example, the imaging unit 111 may capture the image of the region R10*a* using a predetermined process as a trigger and output the captured image to the control unit 120*a*.

(Step S103)

The image analyzing unit 123 acquires the image of the region R10*a* captured by the imaging unit 111, analyzes the image, and detects the manipulator such as the hand positioned in the region R10*a* or the real object such as or the object placed in the region R10*a*.

(Step S105)

The image analyzing unit 123 generates the interim data indicating the detected real object in the region R10*a* on the basis of a detection result. Further, the interim data may be image information of the real object in the region R10*a*.

Further, as another example, the interim data may be control information for displaying (or forming) display information indicating a real object in the region R10*a* such as vector information indicating a position, a direction, a range, or the like of the region corresponding to the real object in the region R10*a*.

(Step S107)

Then, the image analyzing unit 123 outputs the generated interim data to the input analyzing unit 125 and transmits the interim data to the external information processing device 100*b* via the network n11.

Further, as described above, the same process of the information processing device 100*b* is also similar to the above-described content. In other words, the image analyzing unit 123 in the information processing device 100*b* generates the interim data indicating the real object in the region R10*b* on the basis of the image of the region R10*b* captured by the imaging unit 111. Then, the image analyzing unit 123 outputs the generated interim data to the input analyzing unit 125 and transmits the interim data to the external information processing device 100*a* via the network n11.

The example of the flow of the process in which each of the information processing devices 100*a* and 100*b* generates the interim data and transmits the generated interim data to the external information processing device 100 has been described above with reference to FIG. 10.

[4.2. Update and Output of Display Screen]

Next, an example of a flow of a process in which the information processing device 100*a* generates or updates the display screen and outputs the display screen will be described with reference to FIG. 11.

(Step S201)

The input analyzing unit 125 acquires the interim data indicating the detected real object in the region R10*a* from the image analyzing unit 123. The input analyzing unit 125 specifies a real object satisfying a predetermined condition among the detected real objects in the region R10*a* as the manipulator on the basis of the acquired interim data. Then, the input analyzing unit 125 specifies the target of the user manipulation performed by the manipulator or the content of the user manipulation on the basis of the position or the motion of the real object specified as the manipulator.

As described above, the input analyzing unit 125 specifies content of the user manipulation performed by the manipulator such as the hand in the region R10*a* (specifically, a manipulation target or a type of the manipulation), and output manipulation information indicating the specified content of the user manipulation to the screen update unit 127.

The screen update unit 127 acquires the manipulation information indicating the content of the user manipulation on the display screen displayed in the region R10*a* from the input analyzing unit 125. In other words, the screen update unit 127 recognizes the content of the user manipulation on the display screen displayed in the region R10*a* (specifically, the manipulation target or the type of manipulation) on the basis of the manipulation information acquired from the input analyzing unit 125.

Further, the screen update unit 127 acquires the manipulation information indicating the content of the user manipulation on the display screen displayed in the region R10*b* which is similarly generated in the information processing device 100*b* from the information processing device 100*b* via the network n11.

As described above, the screen update unit 127 recognizes the manipulation content of the user manipulation on the display screen displayed in each of the regions R10a and R10b.

(Step S203)

Specifically, the screen update unit 127 updates the display screen to be shared between the information processing devices 100a and 100b on the basis of a recognition result of manipulation content of user manipulation performed on a display screen displayed on each of the regions R10a and R10b. Next, the screen update unit 127 outputs the updated display screen to the display control unit 129a and transmits the screen data for displaying the display screen to the external information processing device 100b via the network n11.

(Step S205)

The display control unit 129a acquires the interim data indicating the detected real object in the region R10b from the information processing device 100b via the network n11. The display control unit 129a generates the display information indicating the real object in the region R10b on the basis of the acquired interim data.

(Step S207)

Further, the display control unit 129a acquires the generated or updated display screen from the screen update unit 127. Then, the display control unit 129a generates an image in which the generated display information indicating the real object in the region R10b is superimposed on the acquired display screen and causes the output unit 130 to output the generated image. Accordingly, the image in which the display information indicating the real object in the region R10b is superimposed on the display screen shared between the information processing devices 100a and 100b is displayed in the region R10a.

The example of a flow of a process in which the information processing device 100a generates or updates the display screen and outputs the display screen has been described with reference to FIG. 11.

[4.3. Acquisition and Output of Display Screen]

Next, an example of a flow of a process in which the information processing device 100b transmits the manipulation information to the information processing device 100a, acquires the display screen generated or updated by the information processing device 100a as a result, and outputs the display screen will be described with reference to FIG. 12.

(Step S301)

The input analyzing unit 125 of the information processing device 100b acquires the interim data indicating the detected real object in the region R10b from the image analyzing unit 123. The input analyzing unit 125 specifies a real object satisfying a predetermined condition among the detected real objects in the region R10b as the manipulator on the basis of the acquired interim data.

Then, the input analyzing unit 125 of the control unit 120b specifies the content of the user manipulation performed by the manipulator in the region R10b (specifically, the manipulation target or the type of manipulation) on the basis of the position or the motion of the specified manipulator and transmits the manipulation information indicating the specified content of the user manipulation to the information processing device 100a via the network n11.

(Step S303)

The display control unit 129b acquires the screen data for displaying the generated or updated display screen from the information processing device 100a via the network n11. Further, the display screen indicated by the screen data acquired at this time may correspond to the display screen updated on the basis of the manipulation information transmitted to the information processing device 100a through the input analyzing unit 125.

(Step S305)

In addition, the display control unit 129b acquires the interim data indicating the detected real object in the region R10a from the information processing device 100a via the network n11. The display control unit 129b generates the display information indicating the real object in the region R10a on the basis of the acquired interim data.

(Step S307)

Then, the display control unit 129b generates an image in which the generated display information indicating the real object in the region R10a is superimposed on the display screen based on the acquired screen data and causes the output unit 130 to output the generated image. Accordingly, the image in which the display information indicating the real object in the region R10a is superimposed on the display screen shared between the information processing devices 100a and 100b is displayed in the region R10b.

The example of a flow of a process in which the information processing device 100b transmits the manipulation information to the information processing device 100a, acquires the display screen generated or updated by the information processing device 100a as a result, and outputs the display screen has been described with reference to FIG. 12.

<5. Modified Examples>

Next, modified examples of information processing system 1 according to one embodiment of the present disclosure will be described.

[5.1. First Modified Example: Presentation of Identification Information]

First, an information processing device 100 according to a first modified example will be described. As described above, the information processing device 100) according to the present embodiment displays the display screen which is shared with another information processing device 100 and the display information indicating the real object placed in the region R10 corresponding to another information processing device 100 in the region R10 corresponding to its own information processing device 100. In other words, the display object displayed in the display screen and the display information indicating the real object are positioned in the region R100 together.

Figure 13:
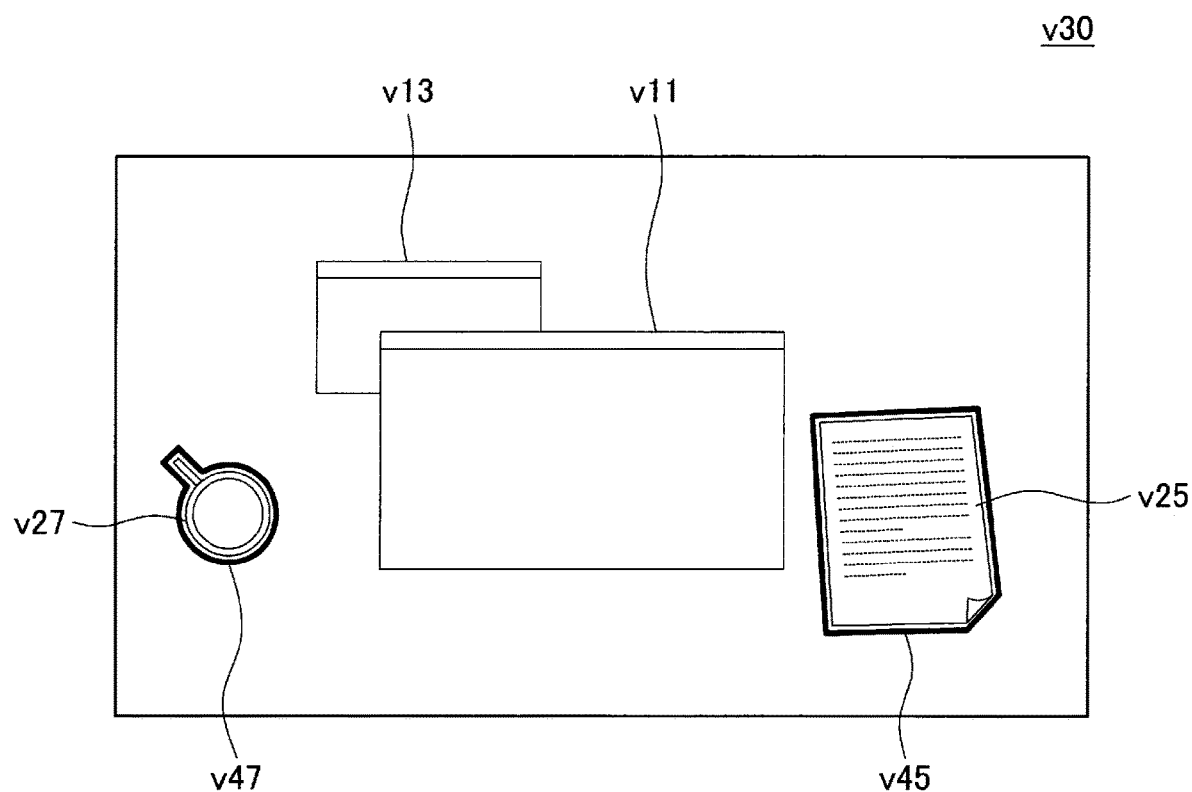
FIG. 13 is an explanatory diagram for describing an overview of an information processing device according to a first modified example.

In this regard, an example of control in which the information processing device 100 presents the display object displayed on the display screen and the display information indicating the real object identifiably will be described as the first modified example with reference to FIG. 13. FIG. 13 is an explanatory diagram for describing an overview of the information processing device 100 according to the first modified example and illustrates an example of a display form for presenting the display object displayed on the display screen and the display information indicating the real object identifiably.

In FIG. 13, reference numerals v11 and v13 indicate display objects displayed on the display screen. Further, reference numerals v25 and v27 indicate display information indicating the real object. In other words, FIG. 13 illustrates an example of an image v30 displayed in the region R10 in which the display information indicating the real object is displayed superimposed on the display screen.

In other words, in the example illustrated in FIG. 13, the information processing device 100 displays identification information v45 and v47 so that outer edges of display information v25 and v27 are framed for the display information v25 and v27 indicating the real object among the information displayed in the image v30.

With this configuration, on the basis of the presented identification information v45 and v47, the user can identify the display object v11 and v13 and the display information v25 and v27 indicating the real objects in the display screen (that is, the image v30) displayed in the region R10.

Further, as long as the display object displayed on the display screen and the display information indicating the real object are presented identifiably, a form thereof is not necessarily limited to the example illustrated in FIG. 13. As a specific example, the information processing device 100 may display a shadow for the display information indicating the real object in a pseudo manner. Accordingly, the user can recognize that the information in which the shadow is displayed among various kinds of information presented on the display screen displayed in the region R10 corresponds to the display information indicating the real object.

Further, the example in which the identification information (for example, a frame or a shadow) is added to the display information indicating the real object out of the display object in the display screen and the display information indicating the real object has been described above, but it will be appreciated that the identification information may be added to the display object side.

As described above, the example of the control in which the information processing device 100 presents the display object displayed on the display screen and the display information indicating the real object identifiably has been described as the first modified example with reference to FIG. 13.

[5.2. Second Modified Example: Projection of Information onto Real Object]

Figure 14:
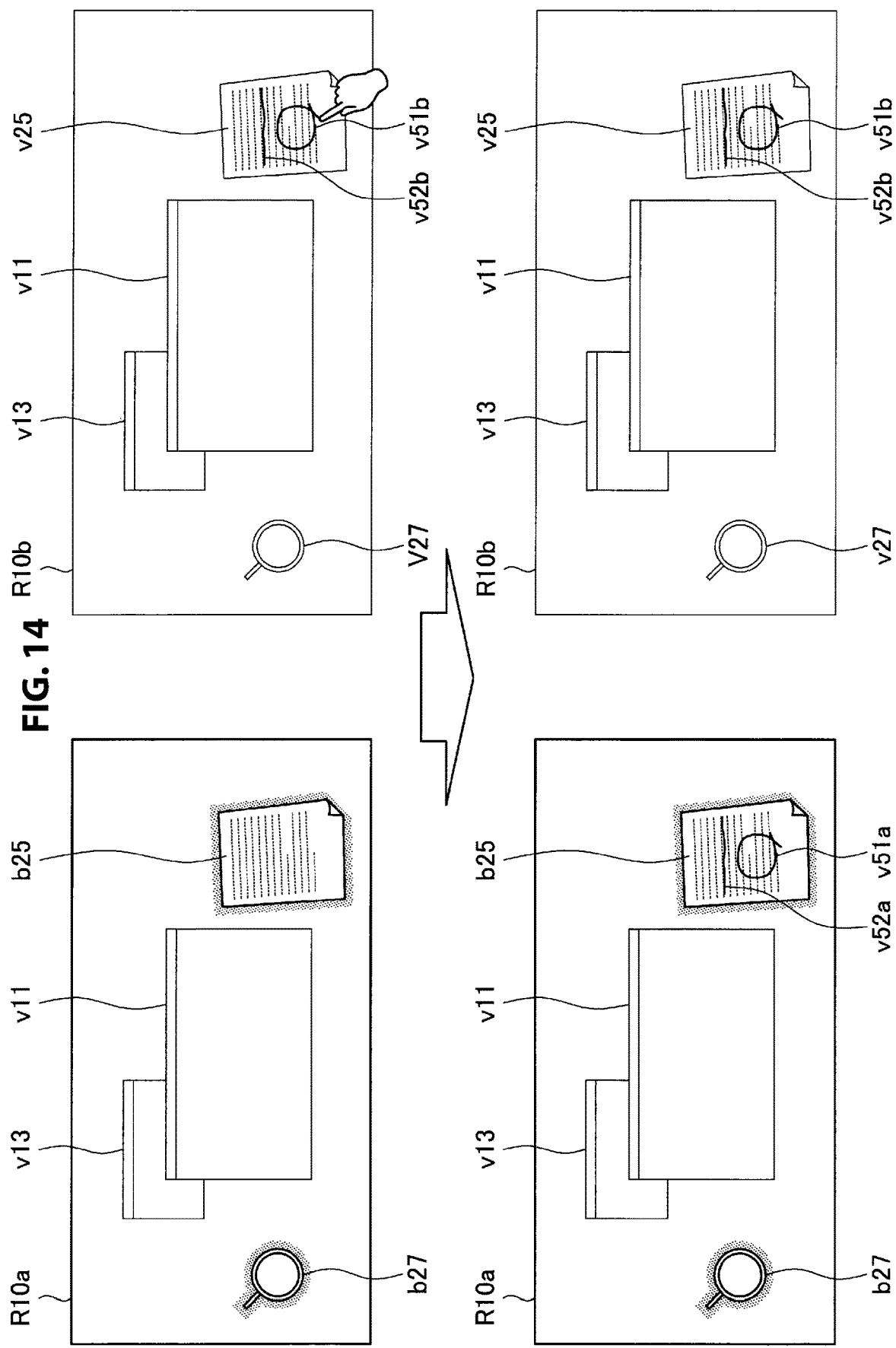
FIG. 14 is an explanatory diagram for describing an overview of an information processing system according to a second modified example.

Next, an information processing system 1 according to a second modified example will be described with reference to FIG. 14. FIG. 14 is an explanatory diagram for describing an overview of the information processing system 1 according to the second modified example.

In the information processing system 1 according to the second modified example, an interaction for the user manipulation on the display information indicating the real object displayed in the region R10 corresponding to one information processing device 100 is projected on the real object (object) arranged in the other region.

For example, in the example illustrated in FIG. 14, a real object b25 (a document on a paper medium) is arranged in a region R10a corresponding to the information processing device 100a. Further, display information v25 corresponding to the real object b25 placed in the region R10 is displayed in a region R10b corresponding to the information processing device 100b.

Here, as illustrated in an upper diagram of FIG. 14, the information processing device 100b causes display information v51b and v52b to be displayed on the display information v25 as an interaction for the user manipulation on the display information v25 displayed in the region R10b. At this time, in the information processing system 1 according to the present embodiment, as illustrated in a lower diagram of FIG. 14, the information processing device 100a projects display information v51a and v52a onto the real object b25 to correspond to the display information v51b and v52b displayed in the region R10b Specifically, the information processing device 100b causes the display information v51b and v52b to be displayed on the display information v25 in the region R10b in accordance with the content of the user manipulation on the display information v25, and transmits the manipulation information indicating the content of the user manipulation (for example, the manipulation target or the type of manipulation) to the information processing device 100a.

Then, the information processing device 100a projects the display information v51a and v52a corresponding to the display information v51b and v52b onto the real object b25 arranged in the region R10a in accordance with the content of the manipulation indicated by the manipulation information acquired from the information processing device 100b.

In other words, according to the information processing system 1 of the second modified example, in a case in which writing is performed on the display information corresponding to the document on the paper medium placed in the other region side in one region, content of the writing is also projected onto the paper medium placed in the other region side as a substance. With this configuration, each user can smoothly perform not only sharing of information (for example, the display object) on the display screen shared between the remote sites but also sharing of information using a medium placed in one workspace (that is, the real object such as the document on the paper medium).

The information processing system 1 according to the second modified example has been described above with reference to FIG. 14.

[5.3. Third Modified Example: Display Control of Display Information Indicating Real Object]

Next, an example of display control of the display information indicating the real object in the information processing system 1 according to the present embodiment will be described as a third modified example. Further, the present description will proceed with an example in which the information processing system 1 includes the information processing devices 100a and 100b, and the information processing device 100b causes the display information indicating the real object placed in the region R10a on the information processing device 100a side to be displayed in the region R10b corresponding to the information processing device 100b.

Figure 15:
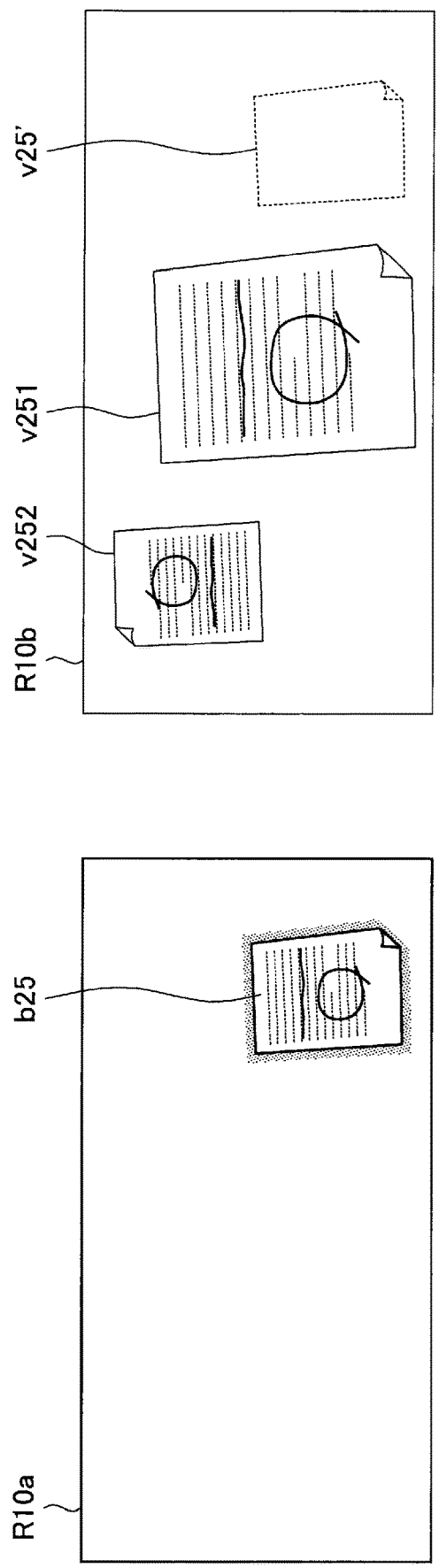
FIG. 15 is an explanatory diagram for describing a form of the information processing system according to the third modified example.

For example, FIG. 15 is an explanatory diagram for describing one from of the information processing system 1 according to the third modified example. In the example illustrated in FIG. 15, the real object b25 is placed in the region R10a on the information processing device 100a side, and the information processing device 100b causes the display information indicating the real object to be displayed in the region R10b corresponding to the information processing device 100b. At this time, the information processing device 100b may move the display position of the display information indicating the real object b25 or present the display information so that the display information can be duplicated or modified.

For example, in FIG. 15, reference numerals v251 and v252 indicate examples of the display information indicating the real object b25. Further, reference numeral v25' indicates a position of the region R10b corresponding to a position of the region R10a at which the real object b25 is placed.

As illustrated in FIG. 15, for example, the information processing device 100b displays the display information v251 and v252 to be displayed in the region R10b as a copy of the display information indicating the real object b25 placed at the position of reference numeral v25' in accordance with the user manipulation. Further, at this time, the information processing device 100b may enlarge or reduce the display information indicating the real object b25 with a size different from that of the actual real object b25 and display it as illustrated as the display information v251.

Further, as illustrated as the display information v252, the information processing device 100b may display the display information indicating the real object b25 in a direction different from the actual real object b25.

Further, in a case in which the display position of the display information indicating the real object b25 is moved, the information processing device 100b may cause presentation information indicating a position at which the real object b25 is placed in the region R10a side to be separately presented in the region R10b side as indicated by reference numeral v25'. Further, in a case in which the position of the real object b25 in the region R10a side is moved, the information processing device 100b may perform control such that the display position of the presentation information indicating the position at which the real object b25 is placed follows movement of the real object b25 in the region R10a side. Further, at this time, the information processing device 100b need not necessarily move the positions of the display information v251 and v252 indicating the real object b25 displayed as a copy.

Further, in a case in which the user manipulation is performed on either of the display information v251 and v252, the information processing device 100b may reflect the interaction for the user manipulation on the other side as well. As a specific example, in a case in which the user manipulation on the display information v251 is received, the information processing device 100b may reflect the interaction for the user manipulation even in the display information v252 in addition to the display information v251. Further, at this time, the information processing device 100a may project the interaction for the user manipulation on the display information v251 onto the real object b25, similarly to the example described above as the second embodiment.

Further, the information processing device 100b may be configured to be able to perform control such that the display information indicating the real object is displayed or not displayed. For example, FIG. 16 is an explanatory diagram for describing another one form of the information processing system 1 according to the third modified example. In the example illustrated in FIG. 16, the information processing device 100b receives the user manipulation and temporarily restricts (that is, does not perform) the display of the display information v25 indicating the real object b25 in the region R10b.

Further, at this time, the information processing device 100a acquires information indicating a display state of the display information v25 indicating the real object b25 from the information processing device 100b and displays display information v61 indicating the display state in association with the corresponding real object b25.

Further, as illustrated in FIG. 16, the information processing device 100b may present a UI v63 for displaying the display information v25 set to the non-display again. In this case, the information processing device 100b receives a manipulation on the UI v63 and displays the display information v25 set to the non-display again.

Further, the information processing system 1 may be configured to be able to control the display form of the display information v25 indicating the real object b25 displayed in the region R10b side on the basis of a manipulation from the region R10a side on which the real object b25 is placed.

Figure 17:
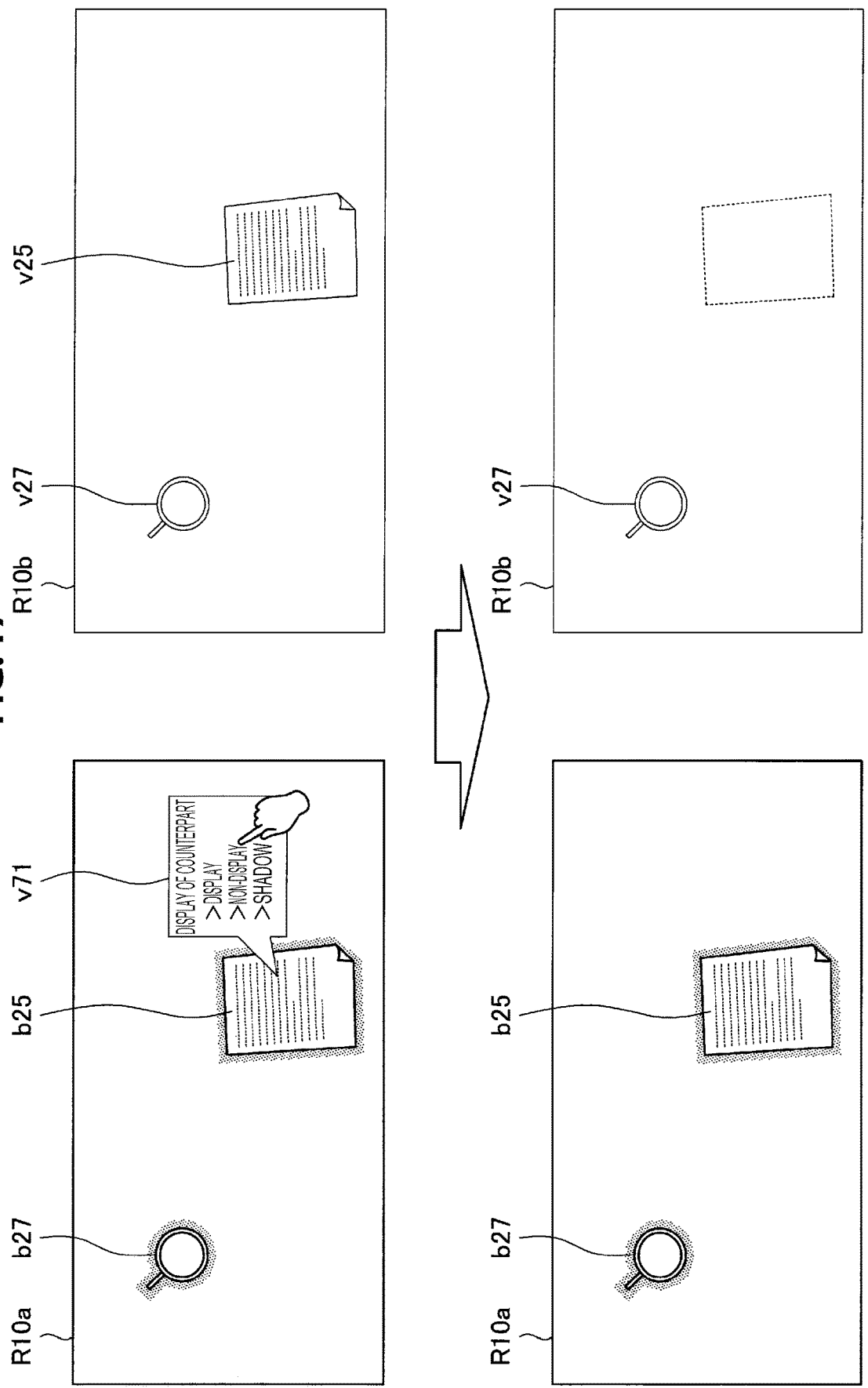
FIG. 17 is an explanatory diagram for describing another form of the information processing system according to the third modified example.

For example, FIG. 17 is an explanatory diagram for describing another form of the information processing system 1 according to the third modified example. In the example illustrated in FIG. 17, as illustrated in an upper diagram of FIG. 17, the information processing device 100a receives a user manipulation and displays a UI v71 for controlling the display form of the display information v25 displayed in the region R10b side in association with the real object b25 corresponding to the display information v25.

In this case, the information processing device 100a may receive a user manipulation on the UI v71 and instruct the information processing device 100b to perform the display control for the display information v25 based on a form designated on the basis of the user manipulation. As a specific example, in a case in which the "non-display" of the display information v25 is designated from the user by the manipulation via the UI v71, the information processing device 100a instructs the information processing device 100b to set the display information v25 to the non-display. Upon receiving the instruction, the information processing device 100b preferably restricts the display of the display information v25 in the region R10b as illustrated in a lower diagram of FIG. 17.

Further, the display control of the display information v25 based on the manipulation on the UI v71 is not limited to the display and the non-display of the display information v25 but may also include switching of the display form of the display information v25. As a specific example, the information processing system 1 may be configured to perform switching between a display form in which the display information v25 is displayed as an image of the real object b25 and a display form in which only the region of the real object b25 is displayed (that is, displayed as a shadow) on the basis of the manipulation on the UI v71.

Further, a display control method is not particularly limited as long as the display of the display information v25 displayed in the region R10b can be controlled on the basis of the user manipulation on the UI v71 presented in the region R10a side. For example, the information processing device 100a may control the transmission of the interim data for displaying the display information v25 to the information processing device 100b on the basis of the user manipulation on the UI v71. As a specific example, in a case in which the "non-display of the display information v25 is designated from the user by the manipulation via the UI v71, the information processing device 100a may restrict the transmission of the interim data for displaying the display information v25 (that is, the interim data corresponding to the real object b25) to the information processing device 100b.

Further, the information processing device 100a may switch content of information to be transmitted as the interim data in accordance with the display form designated by the user by a manipulation via the UI v71. For example, the display form in which the display information v25 is displayed as the image of the real object b25 is assumed to be designated by the user by the manipulation via the UI v71. In this case, the information processing device 100a may transmit the image of the real object b25 to the information processing device 100b as the interim data. On the other hand, the display form in which only the region of the real object b25 is displayed is designated from the user by a manipulation via UI v71. In this case, for example, the information processing device 100a may transmit information indicating a position, a direction, a range, or the like of the region corresponding to the real object b25 in the region R10a (for example, the vector information) as the interim data.

The example of the display control of the display information indicating the real object in the information processing system 1 according to the present embodiment has been described above as the third modified example with reference to FIGS. 14 to 17.

[5.4. Fourth Modified Example: First System Configuration Example (Example of Master/Slave Configuration)]

Next, an example of a system configuration of an information processing system 1 according to the present embodiment will be described as a fourth modified example with reference to FIG. 18. For example, FIG. 18 is an explanatory diagram for describing an example of a schematic system configuration of an information processing system 1 according to the fourth modified example.

In the information processing system 1 (see FIG. 8) according to the above-described embodiment, the information processing device 100a operating as the master transmits the screen data and the interim data corresponding to the real object in the region R10a to the information processing device 100b operating as the slave. In other words, in the information processing system 1, the information processing device 100b generates the image in which the display information indicating the real object in the region R10a is superimposed on the image displayed in the region R10b, that is, the screen data.

Figure 18:
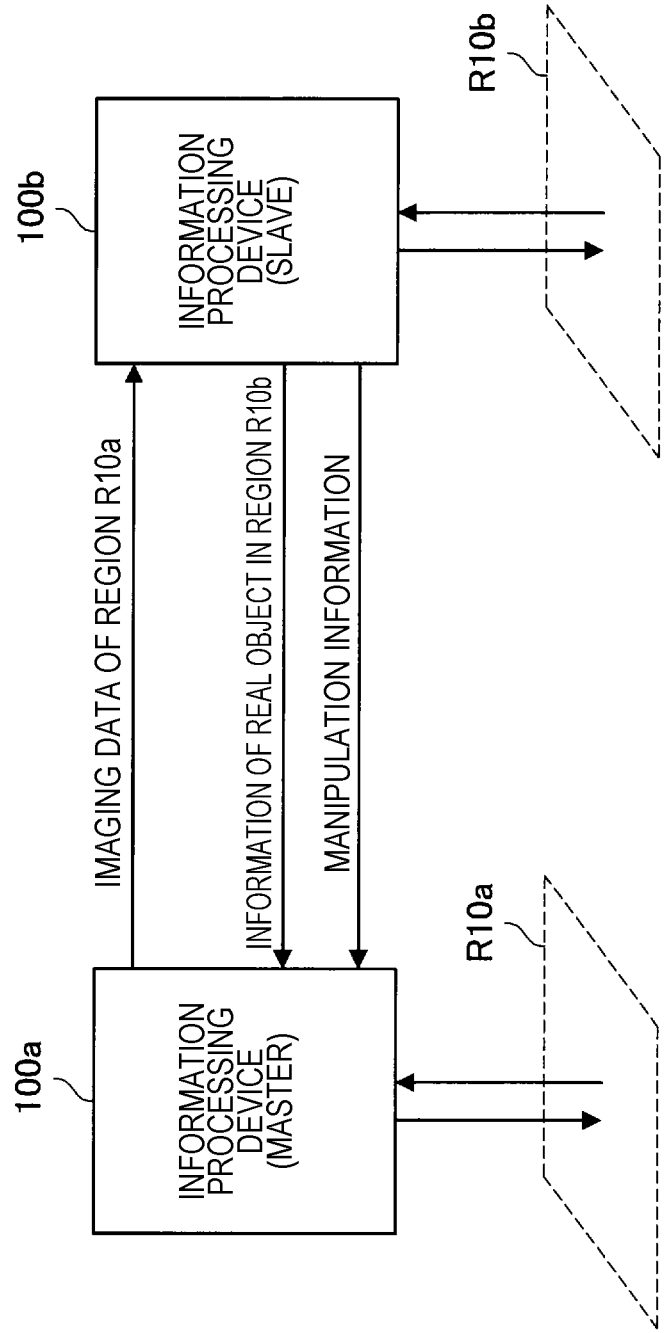
FIG. 18 is an explanatory diagram for describing an example of a schematic system configuration of an information processing system according to a fourth modified example.

On the other hand, in the information processing system 1 according to the fourth modified example, as illustrated in FIG. 18, the information processing device 100a operating as the master transmits an image obtained by imaging the region R10a (hereinafter, referred to as "imaging data") to the information processing device 100b operating as the slave. Further, the display screen shared between the information processing devices 100a and 100b and the real object placed in the region R10a are imaged in the imaging data. Further, in the information processing system 1 according to the fourth modified example, preferably, the information processing device 100b operating as the slave causes the acquired imaging data to be displayed in the region R10b without change.

With this configuration, in the information processing system 1 according to the fourth modified example, the information processing device 100a operating as the master may deliver the imaging data of the region R10a to the information processing device 100b operating as the slave on the basis of a streaming scheme.

Further, content of information transmitted from the information processing device 100b operating as the slave to the information processing device 100a operating as the master and content of control based on the information are similar to those of the information processing system 1 according to the above-described embodiment (see FIG. 8), and thus detailed description is omitted.

With the above configuration, the information processing system 1 according to the fourth modified example can reduce a processing load of the information processing device 100b operating as the slave as compared with the information processing system 1 according to the above described embodiment. The example of the system configuration of the information processing system 1 according to the present embodiment has been described above as the fourth modified example with reference to FIG. 18.

[5.5. Fifth Modified Example: Second System Configuration Example (Configuration in Case in which Server is Disposed)]

Next, an example of a system configuration in which an external server is disposed in addition to the information processing devices 100a and 100b will be described as an example of a system configuration of the information processing system 1 according to one embodiment of the present disclosure as a fifth modified example.

Figure 19:
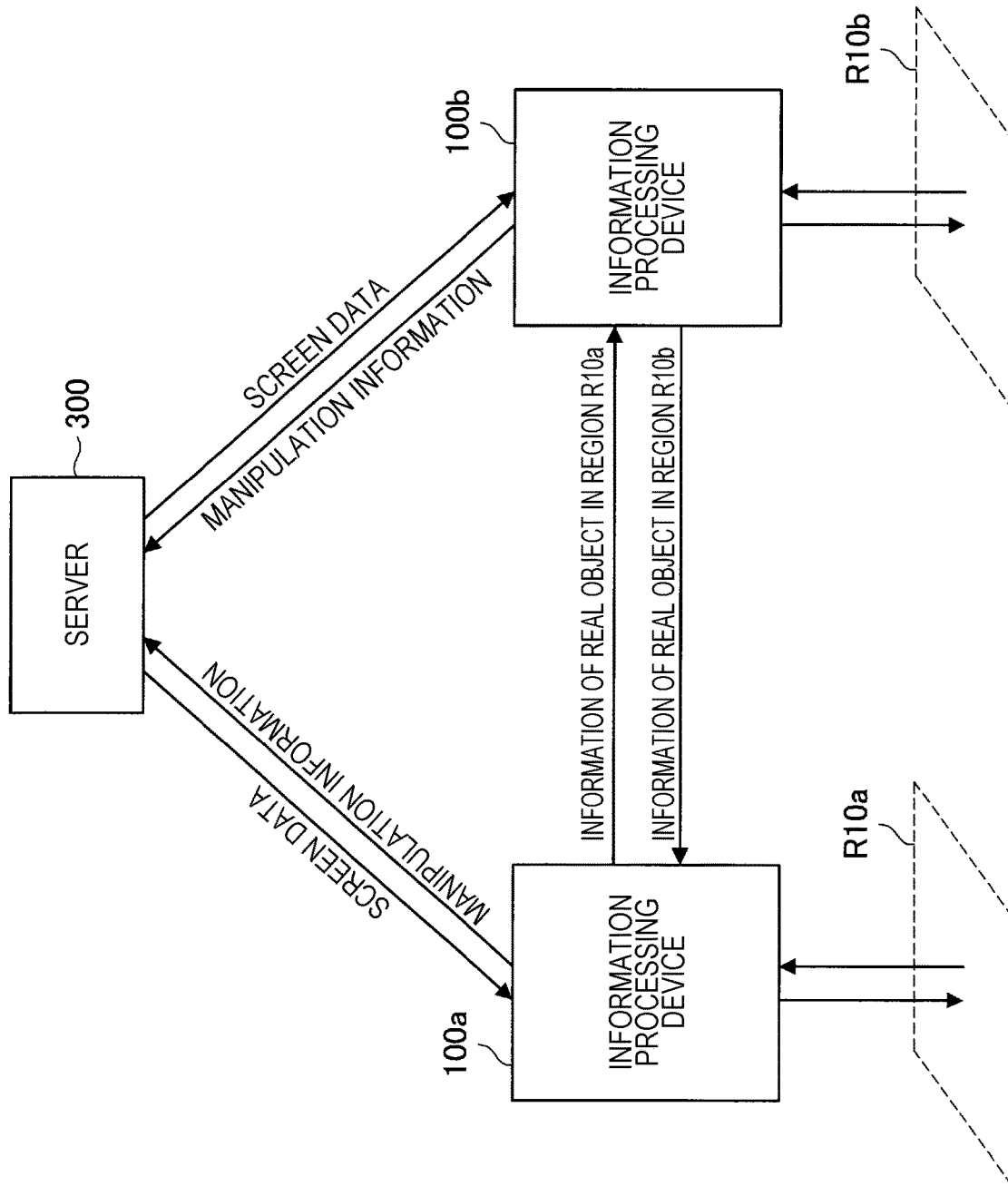
FIG. 19 is an explanatory diagram for describing an example of a schematic system configuration of an information processing system according to a fifth modified example.

For example, FIG. 19 is an explanatory diagram for describing an example of a schematic system configuration of an information processing system 1 according to the fifth modified example. In the example illustrated in FIG. 19, the information processing system 1 includes information processing devices 100a and 100b and a server 300, and the server 300 generates and updates a display screen shared between the information processing devices 100a and 100b.

Specifically, the server 300 acquires manipulation information indicating content of a manipulation on the display screen displayed in the region R10a from the information processing device 100a. Similarly, the server 300 acquires manipulation information indicating content of a manipulation on the display screen displayed in the region R10b from the information processing device 100b. Further, the server 300 updates the display screen on the basis of the manipulation information acquired from each of the information processing devices 100a and 100b and delivers the screen data for displaying the image illustrating the display screen to each of the information processing devices 100a and 100b.

On the other hand, in the example illustrated in FIG. 19, the control for causing the real object to be displayed superimposed on the display screen shared between the information processing devices 100a and 100b is executed by each of the information processing devices 100a and 100b.

For example, if attention is paid to the information processing device 100a, the information processing device 100a detects the real object placed in the region R10a and transmits the interim data for displaying the display information indicating the detected real object to the information processing device 100b.

Further, the information processing device 100a acquires the interim data for displaying the display information indicating the real object placed in the region R10b from the information processing device 100b. The information processing device 100a generates an image in which the display information indicating the real object placed in the region R10b is superimposed on the basis of the interim data acquired from the information processing device 100b in the display screen based on the image data distributed from the server 300. Then, the information processing device 100a projects the generated image onto the region R10a.

Further, an operation of the information processing device 100b is similar to the operation of the information processing device 100a described above. In other words, the information processing device 100b generates an image in which the display information indicating the real object placed in the region R10a is superimposed on the display screen on the basis of the image data delivered from the server 300 and the interim data transmitted from the information processing device 100a and projects the image onto region R10b.

Figure 20:
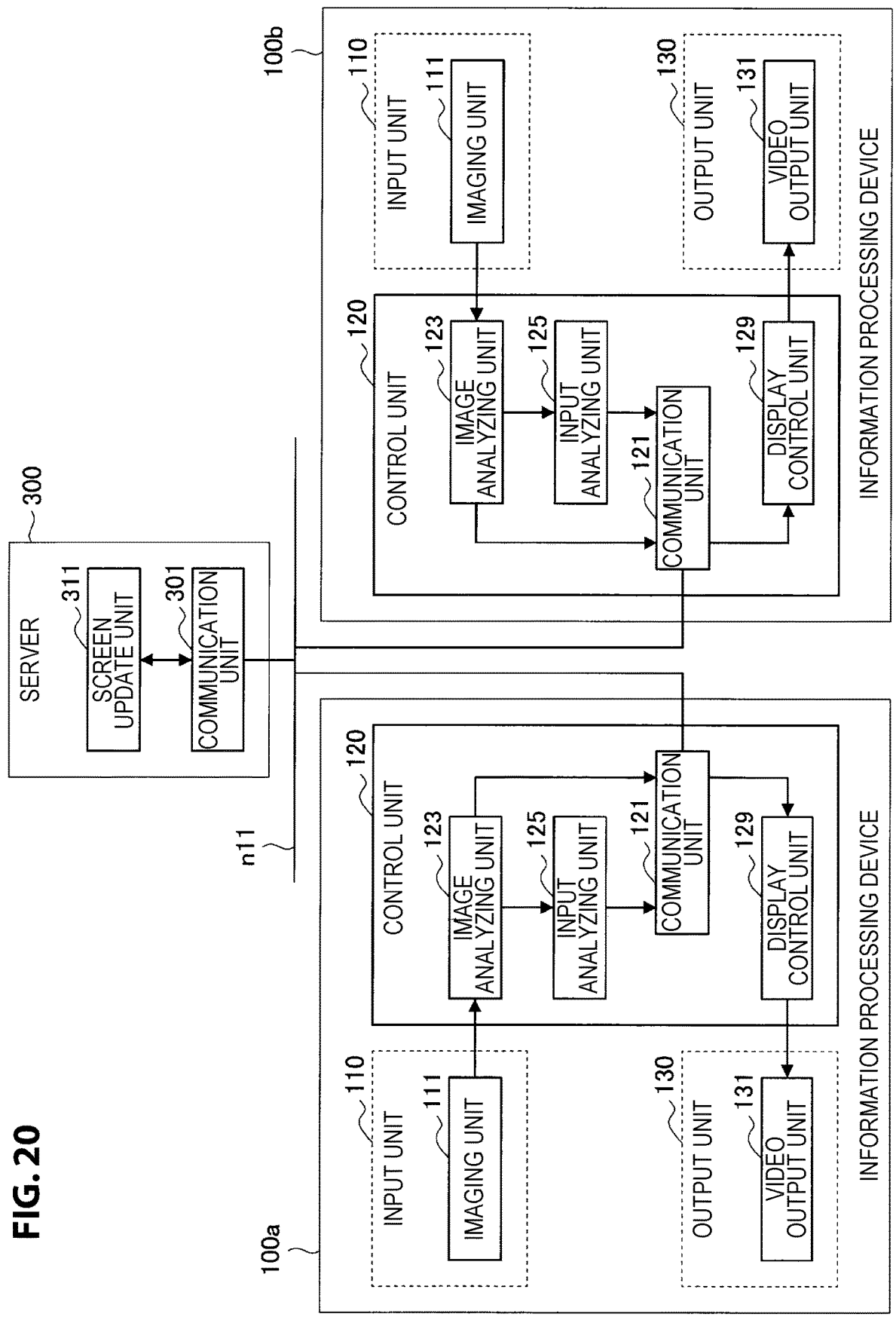
FIG. 20 is a block diagram illustrating an example of a functional configuration of an information processing system according to a fifth modified example.

Here, an example of a functional configuration of the information processing system 1 according to the fifth embodiment illustrated in FIG. 19 will now be described with reference to FIG. 20. FIG. 20 is a block diagram illustrating an example of a functional configuration of the information processing system 1 according to the fifth modified example.

As illustrated in FIG. 20, the server 300 includes a communication unit 301 and a screen update unit 311.

The communication unit 301 is a communication interface that enables the components of the server 300 to communicate with the external information processing devices 100a and 100b via the network n11.

Further, the screen update unit 311 corresponds to the screen update unit 127 of the information processing device 100a operating as the master in the information processing system 1 described above with reference to FIG. 9.

In other words, the screen update unit 311 generates the display screen to be shared between the information processing devices 100a and 100b on the basis of the operation statuses of various kinds of applications.

Further, the screen update unit 311 acquires the manipulation information indicating the content of the user manipulation on the display screen displayed on each of the regions R10a and R10b from the information processing devices 100a and 100b. Then, the screen update unit 311 recognizes the manipulation content of the user manipulation on the display screen displayed on each of the region R10a and R10b on the basis of the acquired manipulation information and updates the display screen shared between the information processing devices 100a and 100b on the basis of the recognized manipulation content.

As described above, the screen update unit 311 delivers the screen data for displaying the generated or updated display screen to the external information processing devices 100a and 100b via the network n11.

Further, in the information processing system 1 according to the fifth embodiment, the information processing devices 100a and 100b have a similar functional configuration as illustrated in FIG. 20. Therefore, the functional configurations of the information processing devices 100a and 100b will be described focusing on the information processing device 100a side, and detailed description of the information processing device 100b side will be omitted.

As illustrated in FIG. 20, the information processing device 100a includes an input unit 110, a control unit 120, and an output unit 130. The input unit 110 and the output unit 130 are similar to those of the information processing system 1 according to the embodiment described above with reference to FIG. 9. Further, the control unit 120 includes a communication unit 121, an image analyzing unit 123, an input analyzing unit 125, and a display control unit 129.

The image analyzing unit 123 corresponds to the image analyzing unit 123 in the information processing system 1 illustrated in FIG. 9. In other words, the image analyzing unit 123 acquires the image of the region R10a captured by the imaging unit 111, analyzes the image, and detects the manipulator such as the hand positioned in the region R10a or the real object such as an object placed in the region R10a. Then, the image analyzing unit 123 outputs the interim data indicating the detected real object in the region R10a to the input analyzing unit 125 and transmits the interim data to the external information processing device 100b via the network n11.

Further, the input analyzing unit 125 corresponds to the input analyzing unit 125 in the information processing system 1 illustrated in FIG. 9. In other words, the input analyzing unit 125 acquires the interim data from the image analyzing unit 123 and specifies a real object satisfying a predetermined condition among the detected real objects in the region R10a as the manipulator on the basis of the acquired interim data. Then, the input analyzing unit 125 specifies the target of the user manipulation performed by the manipulator or the content of the user manipulation on the basis of the position or the motion of the real object specified as the manipulator.

As described above, the input analyzing unit 125 specifies content of the user manipulation performed by the manipulator such as the hand in the region R10a (specifically, a manipulation target or a type of the manipulation), and transmits manipulation information indicating the specified content of the user manipulation to the server 300 via the network n11.

The display control unit 129 acquires the generated or updated display screen from the server 300 via the network n11. Further, the display control unit 129 acquires the interim data indicating the detected real object in the region R10b from the information processing device 100b via the network n11. The display control unit 129 generates display information indicating the real object in the region R10b on the basis of the acquired interim data. Then, the display control unit 129 generates an image in which the generated display information indicating the real object in the region R10b is superimposed on the acquired display screen and causes the output unit 130 to output the generated image. Accordingly, the display screen on which the display information indicating the real object in the region R10b is superimposed is displayed in the region R10a.

The example of the configuration in which the external server 300 generates and updates the display screen shared between the information processing devices 100a and 100b has been described as the example of the system configuration of the information processing system 1 according to the fifth modified example with reference to FIGS. 19 and 20.

Further, the example described above with reference to FIGS. 19 and 20 is merely an example. In other words, the functional configuration of the information processing system 1 according to the fifth modified example is not particularly limited as long as at least some of the processes of the information processing devices 100a and 100b described above with reference to FIG. 9 are processed by the server 300.

Figure 21:
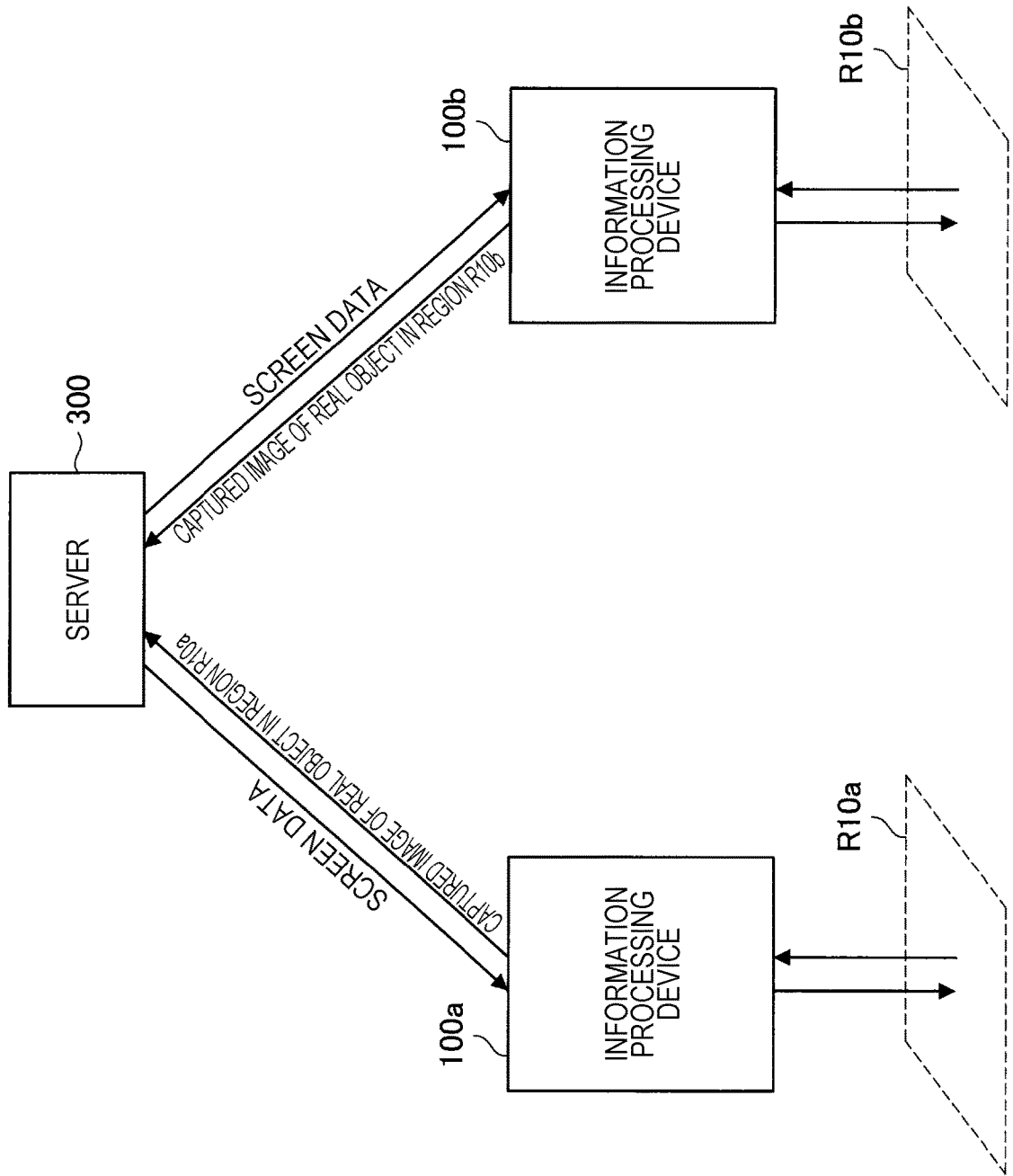
FIG. 21 is an explanatory diagram for describing another example of a schematic system configuration of the information processing system according to the fifth modified example.

For example, FIG. 21 is an explanatory diagram for describing another example of the schematic system configuration of the information processing system 1 according to the fifth modified example. In the example illustrated in FIG. 21, a series of processes such as the detection of the real object from the captured images of the regions R10a and R10b, the generation and update of the display screen shared between the information processing devices 100a and 100b, and the superimposed display of the display information indicating the real object on the display screen is executed by the server 300.

Specifically, the information processing device 100a transmits the image of the region R10a captured by the input unit 110 to the server 300 via the network n11. Similarly, the information processing device 100b transmits the image of the region R10b captured by the input unit 110 to the server 300 via the network n11.

The server 300 analyzes the image of the region R10a acquired from the information processing device 100a and detects the real object such as the manipulator such as the hand positioned in the region R10a or an object placed in the region R10a. Similarly, the server 300 analyzes the image of the region R10b acquired from the information processing device 100b and detects the real object such as the manipulator such as the hand positioned in the region R10b or an object placed in the region R10b.

Then, the server 300 specifies a real object satisfying a predetermined condition among the real objects detected from each of the region R10a and the region R10b as the manipulator. The server 300 specifies the target of the user manipulation performed by the manipulator or the content of the user manipulation on the basis of the position or the motion of the real object specified as the manipulator. Then, the server 300 generates and updates the display screen shared between the information processing devices 100a and 100b on the basis of the specified content of the user manipulation.

Then, the server 300 generates an image of the display screen to be displayed in the region R10a and the region R10b on the basis of the generated and updated display screen and the detection result of the real object placed in the region R10a and the region R10b.

Specifically, the server 300 generates an image in which the display information indicating the real object placed in the region R10b is displayed superimposed on the display screen on the basis of the generated and updated display screen and the detection result of the real object placed in the region R10b. Then, the server 300 transmits the generated image to the information processing device 100b.

In addition, the server 300 generates an image in which the display information indicating the real object placed in the region R10a is displayed superimposed on the display screen on the basis of the generated and updated display screen and the detection result of the real object placed in the region R10a. Then, the server 300 transmits the generated image to the information processing device 100b.

Next, it is only necessary for the information processing devices 100a and 100b to cause the respective images delivered from the server 300 to be displayed in the regions R10 corresponding to the information processing devices 100a and 100b. Note that, the server 300 may transmit the images on the basis of the streaming scheme when transmitting the respective images to the information processing devices 100a and 100b. Note that, in the case of this configuration, information transmitted (delivered) from the server 300 to each of the information processing devices 100a and 100b (in other words, data for displaying the generated images) corresponds to an example of the "second control information".

With the above configuration, the image in which the display information indicating the real object placed in the region R10b is displayed superimposed on the display screen shared between the information processing devices 100a and 100b is displayed in the region R10a corresponding to the information processing device 100a side. Similarly, the image in which the display information indicating the real object placed in the region R10a is displayed superimposed on the display screen shared between the information processing devices 100a and 100b is displayed in the region R10b corresponding to the information processing device 100b side.

As described above, another example of the schematic system configuration of the information processing system 1 according to the fifth modified example has been described with reference to FIG. 21.

As described above as the fifth modified example, in the information processing system 1 according to one embodiment of the present disclosure, the server 300 is disposed, and at least some of the processes of the information processing devices 100a and 100b described with reference to FIG. 9 are processed by the server 300. As described above, since the server 300 is disposed, it is possible to reduce the processing load of the information processing devices 100a and 100b.

<6. Hardware Configuration>

Figure 22:
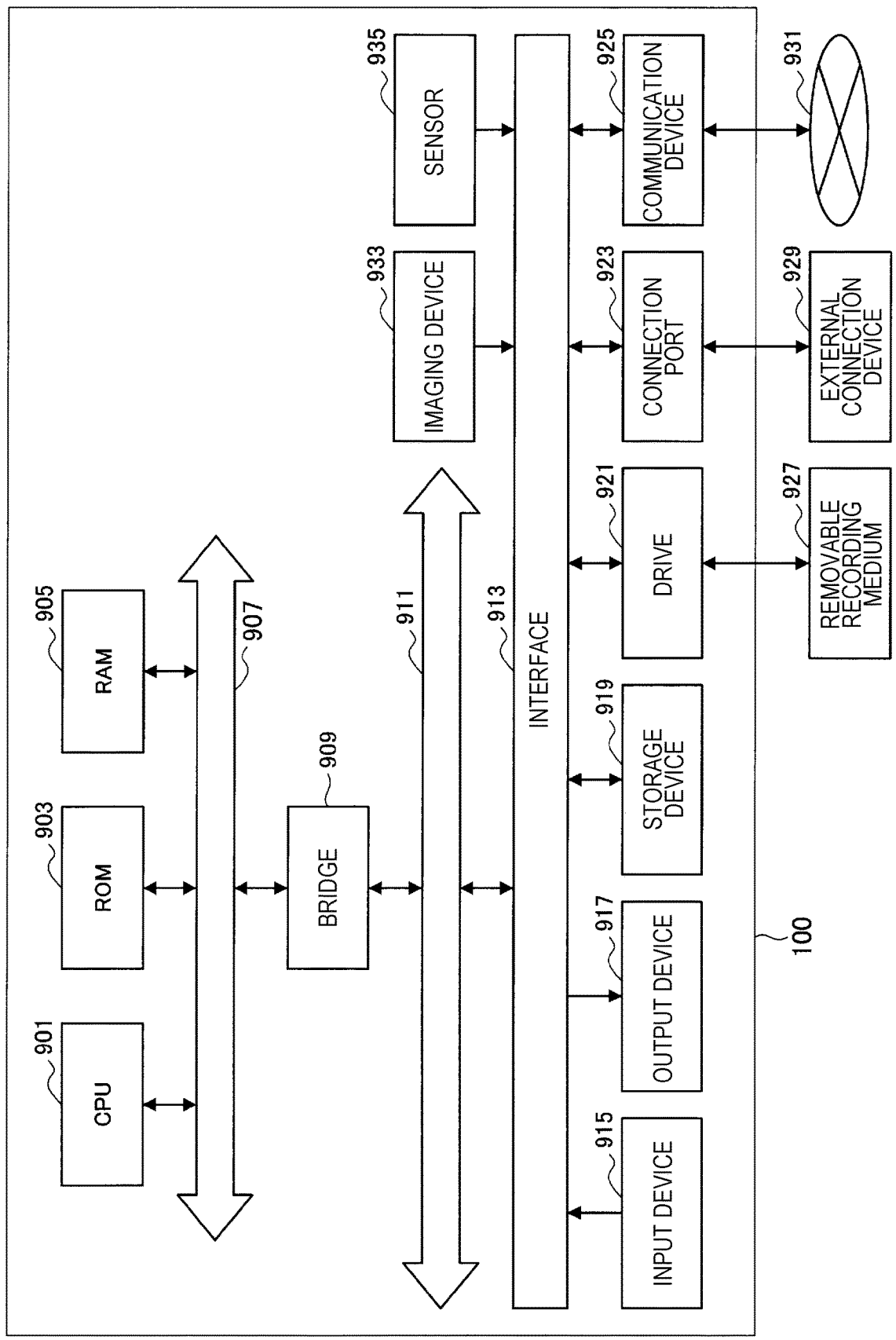
FIG. 22 is a block diagram illustrating a hardware configuration example of the information processing device according to the embodiment.

Next, a hardware configuration of the information processing device 100 according to an embodiment of the present disclosure will be described with reference to FIG. 22. FIG. 22 is a block diagram illustrating a hardware configuration example of the information processing device 100 according to an embodiment of the present disclosure.

As illustrated in FIG. 22, the information processing device 100 includes a central processing unit (CPU) 901, a read only memory (ROM) 903, and a random access memory (RAM) 905. In addition, the information processing device 100 may include a host bus 907, a bridge 909, an external bus 911, an interface 913, an input device 915, an output device 917, a storage device 919, a drive 921, a connection port 923, and a communication device 925. Further, the information processing device 100 may include an imaging device 933 and a sensor 935 as necessary. The information processing device 100 may include a processing circuit such as a digital signal processor (DSP) or an application specific integrated circuit (ASIC) instead of or in addition to the CPU 901.

The CPU 901 serves as an operation processing device and a control device, and controls all of or a part of the operations in the information processing device 100 in accordance with various programs recorded in the ROM 903, the RAM 905, the storage device 919 or a removable recording medium 927. The ROM 903 stores programs and operation parameters used by the CPU 901. The RAM 905 temporarily stores program used in the execution of the CPU 901 and parameters that changes as appropriate in the execution. The CPU 901, ROM 903, and RAM 905 are connected to each other by the host bus 907 including an internal bus such as a CPU bus. In addition, the host bus 907 is connected to the external bus 911 such as a peripheral component interconnect/interface (PCI) bus via the bridge 909.

The input device 915 is, for example, a device operated by a user with a mouse, a keyboard, a touch panel, buttons, switches, a lever, and the like. The input device 915 may include a mic that detects a sound of a user. The input device 915 may be, for example, a remote control unit using infrared light or other radio waves, or may be an external connection device 929 such as a portable phone operable in response to the operation of the information processing device 100. The input device 915 includes an input control circuit that generates an input signal on the basis of the information input by a user and outputs the input signal to the CPU 901. By operating the input device 915, a user can input various types of data to the information processing device 100 or issue instructions for causing the information processing device 100 to perform a processing operation. In addition, the imaging device 933 to be described below can function as an input device by imaging a motion or the like of a hand of the user.

The output device 917 includes a device capable of visually or audibly notifying a user of the acquired information. The output device 917 may be, for example, a display device such as a liquid crystal display (LCD), a plasma display panel (PDP), an organic electro-luminescence (EL) display, and a projector, a hologram display device, an audio output device, such as a speaker or a headphone, and a printer. The output device 917 outputs the results obtained from the process of the information processing device 100 in a form of video such as text or an image and audio such as voice or sound. In addition, the output device 917 may include a light or the like to brighten the surroundings.

The storage device 919 is a device for data storage configured as an example of a storage unit of the information processing device 100. The storage device 919 includes, for example, a magnetic storage device such as a hard disk drive (HDD), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing device 100 or externally attached thereto. The drive 921 reads information recorded in the attached removable recording medium 927 and outputs the information to the RAM 905. Further, the drive 921 writes record in the attached removable recording medium 927.

The connection port 923 is a port used to directly connect devices to the information processing device 100. The connection port 923 may be, for example, a universal serial bus (USB) port, an IEEE1394 port, a small computer system interface (SCSI) port, or the like. In addition, the connection port 923 may be an RS-232C port, an optical audio terminal, High-Definition Multimedia Interface (HDMI) (registered trademark) port, or the like. By connecting the external connection device 929 to the connection port 923, various data may be exchanged between the information processing device 100 and the external connection device 929.

The communication device 925 is, for example, a communication interface including a communication device or the like for connection to a communication network 931. The communication device 925 may be, for example, a communication card for a wired or wireless local area network (LAN), Bluetooth (registered trademark), wireless USB (WUSB), or the like. In addition, the communication device 925 may be a router for optical communication, a router for asymmetric digital subscriber line (ADSL), a modem for various kinds of communications, or the like. The communication device 925 transmits and receives signals to and from, for example, the Internet or other communication devices using a predetermined protocol such as TCP/IP. In addition, the communication network 931 to be connected to the communication device 925 is a network connected in a wired or wireless manner, and is, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal oxide semiconductor (CMOS), as well as various members such as one or more lenses for controlling the formation of a subject image on the image sensor, for example. The imaging device 933 may be a device that captures still images and may also be a device that captures moving images.

The sensor 935 is any of various sensors such as an acceleration sensor, a gyro sensor, a geomagnetic sensor, an optical sensor, or a sound sensor, for example. The sensor 935 acquires information regarding the state of the information processing device 100, such as the attitude of the case of the information processing device 100, as well as information regarding the environment surrounding the information processing device 100, such as brightness or noise surrounding the information processing device 100, for example. The sensor 935 may also include a global positioning system (GPS) sensor that receives GPS signals and measures the latitude, longitude, and altitude of the device.

The foregoing thus illustrates an exemplary hardware configuration of the information processing device 100. Each of the above components may be realized with general-purpose members or hardware specialized in the function of each component. Such a configuration may also be modified as appropriate in accordance with the technological level at the time of the implementation.

<7. Conclusion>

As described above, the information processing system 1 according to the present embodiment includes a plurality of information processing devices 100 connected via a network. In the information processing system 1, a plurality of information processing devices 100 captures the image of the region R10 corresponding to the workspace of the information processing device 100 and detects the real object placed in the region R10 on the basis of the analysis result of the image. Then, the image in which the display information indicating the real object detected from the other region R10 is displayed superimposed on the display screen shared among a plurality of information processing devices 100 is displayed in one of the regions R10.

With the above configuration, according to the information processing system 1 of the present embodiment, it is possible to display the shared display screen and the information indicating the real object placed in each workspace in an appropriate form among a plurality of information processing devices 100.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device, including:

an acquiring unit configured to acquire first control information for causing display information to be displayed, the display information indicating a real object placed in a first region in which a screen shared by a plurality of devices is displayed; and a generating unit configured to generate second control information for causing a display image in which the display information indicating the real object is superimposed on the screen to be displayed in a second region different from the first region, on a basis of the acquired first control information.

(2)

The information processing device according to (1), in which the generating unit generates the second control information for causing the display image in which an image of the real object is superimposed on the screen to be displayed in the second region on the basis of the first control information.

(3)

The information processing device according to (1), in which the generating unit generates the second control information for causing the display image in which display information indicating a region occupied by the real object is superimposed on the screen to be displayed in the second region on the basis of the first control information.

(4)

The information processing device according to any one of (1) to (3), in which the generating unit generates the second control information for causing the display image in which display information indicating the real object satisfying a predetermined condition among the real objects placed in the first region is superimposed on the screen to be displayed in the second region.

(5)

The information processing device according to (4), in which the generating unit generates the second control information for causing the display image in which display information indicating the real object that is operating among the real objects placed in the first region is superimposed on the screen to be displayed in the second region.

(6)

The information processing device according to any one of (1) to (5), in which the generating unit generates the second control information for causing the display image in which display of the display information indicating the real object is restricted for at least one of the real objects placed in the first region to be displayed in the second region.

(7)

The information processing device according to any one of (1) to (6), in which the generating unit generates the second control information for causing the display image in which a display object presented on the screen and the display information indicating the real object are presented in different forms to be displayed in the second region.

(8)

The information processing device according to any one of (1) to (7), in which the acquiring unit acquires manipulation information indicating manipulation content on the real object in the first region, and the generating unit generates the second control information for causing the display image in which display information corresponding to the manipulation content is presented to be displayed in the second region on a basis of the acquired manipulation information.

(9)

The information processing device according to any one of (1) to (8), in which the acquiring unit acquires manipulation information indicating manipulation content of the display information indicating the real object displayed in the second region, and the generating unit controls display of the display information indicating the real object to the display image on a basis of the acquired manipulation information.

(10)

The information processing device according to any one of (1) to (9), including a display control unit configured to cause the display image to be displayed in the second region on a basis of the second control information.

(11)

The information processing device according to (10)

in which the display control unit causes a projection unit configured to project the display information onto the second region to project the display image onto the second region on the basis of the second control information.

(12)

The information processing device according to any one of (1) to (9), including a transmitting unit configured to transmit the second control information to an external device configured to control display of information in the second region.

(13)

The information processing device according to any one of (1) to (12), in which the first region and the second region are different regions which are apart from each other.

(14)

An information processing device, including:

an acquiring unit configured to acquire an image of a first region in which a screen shared by a plurality of devices is displayed, the image of the first region being captured by an imaging unit; and a generating unit configured to generate control information for causing display information indicating a real object placed in the first region to be displayed in a second region different from the first region in which the screen is displayed, on a basis of the acquired image of the first region.

(15)

The information processing device according to (14), in which the control information is a partial image of the real object extracted from the image of the first region.

(16)

The information processing device according to (14) or (15), in which the control information includes at least any of information indicating a position, a direction, and a range of the real object in the first region.

(17)

The information processing device according to any one of (14) to (16), including a transmitting unit configured to transmit the control information to an external device configured to control display of information in the second region.

(18)

The information processing device according to any one of (14) to (16), including a transmitting unit configured to transmit an image in which the display information indicating the real object is superimposed on the screen to an external device configured to control display of information in the second region, on a basis of the control information.

(19)

The information processing device according to any one of (14) to (18), including the imaging unit.

(20)

The information processing device according to any one of (14) to (18), in which the acquiring unit acquires the captured image of the first region from an external device.

(21)

The information processing device according to any one of (14) to (20), including a display control unit configured to control display of information in the first region, in which the acquiring unit acquires manipulation information indicating manipulation content of the display information indicating the real object displayed in the second region, and the display control unit causes display information corresponding to the manipulation content to be displayed on the real object placed in the first region on a basis of the manipulation information.

(22)

An information processing method, including:

acquiring first control information for causing display information indicating a real object placed in a first region in which a screen shared by a plurality of devices is displayed to be displayed in a second region different from the first region; and generating, by a processor, second control information for causing a display image in which the display information indicating the real object is superimposed on the screen to be displayed in the second region on a basis of the acquired first control information.

(23)

An information processing method, including:

acquiring an image of a first region in which a screen shared by a plurality of devices is displayed, the image of the first region being captured by an imaging unit; and generating, by a processor, control information for causing display information indicating a real object placed in the first region to be displayed in a second region different from the first region in which the screen is displayed, on a basis of the acquired image of the first region.

(24)

A program causing a computer to execute:

acquiring first control information for causing display information indicating a real object placed in a first region in which a screen shared by a plurality of devices is displayed to be displayed in a second region different from the first region; and generating second control information for causing a display image in which the display information indicating the real object is superimposed on the screen to be displayed in the second region on a basis of the acquired first control information.

(25)

A program causing a computer to execute:

acquiring an image of a first region in which a screen shared by a plurality of devices is displayed, the image of the first region being captured by an imaging unit; and generating control information for causing display information indicating a real object placed in the first region to be displayed in a second region different from the first region in which the screen is displayed, on a basis of the acquired image of the first region.

REFERENCE SIGNS LIST 1 information processing system
100, 100a, 100b information processing device
110 input unit
111 imaging unit
120, 120a, 120b control unit
121 communication unit
123 image analyzing unit
125 input analyzing unit
127 screen update unit
129, 129a, 129b display control unit
130 output unit
131 video output unit
300 server
301 communication unit
311 screen update unit

The invention claimed is:

1. An information processing device, comprising:

an acquiring unit configured to acquire first control information indicating a real object placed in a first region in which a screen shared by a plurality of devices is displayed; and a generating unit configured to generate second control information for causing a display image to be displayed in which display information indicating the real object is superimposed on the shared screen when it is displayed in a second region different from the first region, on a basis of the acquired first control information, wherein the acquiring unit is further configured to acquire manipulation information indicating manipulation content of the display information indicating the real object displayed in the second region, the manipulation content being specified based on at least one of a position or a motion of a manipulator, wherein the generating unit is further configured to generate third control information for causing a display image to be displayed in which display information indicating the manipulation content is superimposed on the real object placed in the first region, on a basis of the acquired manipulation information, and wherein the acquiring unit and the generating unit are each implemented via at least one processor.

2. The information processing device according to claim 1, wherein the generating unit generates the second control information for causing the display image in which an image of the real object is superimposed on the shared screen to be displayed in the second region on the basis of the first control information.

3. The information processing device according to claim 1, wherein the generating unit generates the second control information for causing the display image in which display information indicating a region occupied by the real object is superimposed on the shared screen to be displayed in the second region on the basis of the first control information.

4. The information processing device according to claim 1, wherein the generating unit generates the second control information for causing the display image in which the display information indicating a selected real object satisfying a predetermined condition among a plurality of real objects placed in the first region is superimposed on the shared screen to be displayed in the second region.

5. The information processing device according to claim 4, wherein the generating unit generates the second control information for causing the display image in which display information indicating the selected real object that is operating among the plurality of real objects placed in the first region is superimposed on the shared screen to be displayed in the second region.

6. The information processing device according to claim 1, wherein the generating unit generates the second control information for causing the display image in which display of the display information indicating the real object is restricted for at least one of a plurality of real objects placed in the first region to be superimposed on the shared screen to be displayed in the second region.

7. The information processing device according to claim 1, wherein the generating unit generates the second control information for causing the display image in which a display object presented on the shared screen and the display information indicating the real object are presented in different forms to be displayed in the second region.

8. The information processing device according to claim 1,
wherein the acquiring unit is further configured to acquire manipulation information indicating manipulation content on the real object in the first region, and
wherein the generating unit generates the second control information for causing the display image in which display information corresponding to the manipulation content is presented to be displayed on the shared screen in the second region on a basis of the acquired manipulation information.

9. The information processing device according to claim 1, further comprising,
a display control unit configured to cause the display image to be displayed in the second region on a basis of the second control information,
wherein the display control unit is implemented via at least one processor.

10. The information processing device according to claim 9,
wherein the display control unit causes a projection unit configured to project the display information onto the second region to project the display image onto the second region on the basis of the second control information.

11. The information processing device according to claim 1, further comprising,
a transmitting unit configured to transmit the second control information to an external device configured to control display of information in the second region,
wherein the transmitting unit is implemented via at least one processor.

12. The information processing device according to claim 1,
wherein the first region and the second region are different regions which are apart from each other.

13. An information processing device, comprising:
an acquiring unit configured to acquire an image of a first region in which a screen shared by a plurality of devices is displayed, the image of the first region being captured by an imaging unit; and
a generating unit configured to generate control information for causing a display image to be displayed in which display information indicating a real object placed in the first region is superimposed on the shared screen when it is displayed in a second region different from the first region, on a basis of the acquired image of the first region,
wherein the acquiring unit is further configured to acquire manipulation information indicating manipulation content of the display information indicating the real object displayed in the second region, the manipulation content being specified based on at least one of a position or a motion of a manipulator,
wherein the generating unit is further configured to generate control information for causing a display image to be displayed in which display information indicating the manipulation content is superimposed on the real object placed in the first region, on a basis of the acquired manipulation information, and
wherein the acquiring unit and the generating unit are each implemented via at least one processor.

14. The information processing device according to claim 13,
wherein the control information comprises information of a partial image of the real object extracted from the acquired image of the first region.

15. The information processing device according to claim 13,
wherein the control information includes at least any of information indicating a position, a direction, and a range of the real object in the first region.

16. The information processing device according to claim 13, further comprising:
a transmitting unit configured to transmit the control information to an external device configured to control display of information in the second region,
wherein the transmitting unit is implemented via at least one processor.

17. The information processing device according to claim 13, further comprising:
a transmitting unit configured to transmit an image in which the display information indicating the real object is superimposed on the shared screen to an external device configured to control display of information in the second region, on a basis of the control information,
wherein the transmitting unit is implemented via at least one processor.

18. The information processing device according to claim 13, further comprising:
the imaging unit.

19. The information processing device according to claim 13,
wherein the acquiring unit acquires the captured image of the first region from an external device.

20. The information processing device according to claim 13, further comprising:
a display control unit configured to control display of information in the first region,
wherein the display control unit causes the display information corresponding to the manipulation content to be displayed on the real object placed in the first region, on a basis of the manipulation information, and
wherein the display control unit is implemented via at least one processor.

21. An information processing method, comprising:
acquiring first control information indicating a real object placed in a first region in which a screen shared by a plurality of devices is displayed;
generating, by a processor, second control information for causing a display image to be displayed in which display information indicating the real object is superimposed on the shared screen when it is displayed in a second region different from the first region, on a basis of the acquired first control information;
acquiring manipulation information indicating manipulation content of the display information indicating the real object displayed in the second region; and
generating, by the processor, third control information for causing a display image to be displayed in which display information indicating the manipulation content is superimposed on the real object placed in the first region, on a basis of the acquired manipulation information, the manipulation content being specified based on at least one of a position or a motion of a manipulator.

22. An information processing method, comprising:
acquiring an image of a first region in which a screen shared by a plurality of devices is displayed, the image of the first region being captured by an imaging unit;
generating, by a processor, control information for causing display information indicating a real object placed in the first region to be displayed in a second region different from the first region in which the screen is displayed, on a basis of the acquired image of the first region,
acquiring manipulation information indicating manipulation content of the display information indicating the real object displayed in the second region; and
generating, by the processor, control information for causing a display image to be displayed in which display information indicating the manipulation content is superimposed on the real object placed in the first region, on a basis of the acquired manipulation information, the manipulation content being specified based on at least one of a position or a motion of a manipulator.

23. A non-transitory computer-readable medium having embodied thereon a program, which when executed by a computer causes the computer to execute a method, the method comprising:
acquiring first control information indicating a real object placed in a first region in which a screen shared by a plurality of devices is displayed;
generating second control information for causing a display image to be displayed in which display information indicating the real object is superimposed on the shared screen when it is displayed in a second region different from the first region, on a basis of the acquired first control information;
acquiring manipulation information indicating manipulation content of the display information indicating the real object displayed in the second region; and
generating third control information for causing a display image to be displayed in which display information indicating the manipulation content is superimposed on the real object placed in the first region, on a basis of the acquired manipulation information, the manipulation content being specified based on at least one of a position or a motion of a manipulator.

24. A non-transitory computer-readable medium having embodied thereon a program, which when executed by a computer causes the computer to execute a method, the method comprising:
acquiring an image of a first region in which a screen shared by a plurality of devices is displayed, the image of the first region being captured by an imaging unit;
generating control information for causing display information indicating a real object placed in the first region to be displayed in a second region different from the first region in which the screen is displayed, on a basis of the acquired image of the first region;
acquiring manipulation information indicating manipulation content of the display information indicating the real object displayed in the second region; and
generating control information for causing a display image to be displayed in which display information indicating the manipulation content is superimposed on the real object placed in the first region, on a basis of the acquired manipulation information, the manipulation content being specified based on at least one of a position or a motion of a manipulator.

* * * * *